(12) United States Patent
Thompson

(10) Patent No.: US 6,490,840 B1
(45) Date of Patent: *Dec. 10, 2002

(54) HURRICANE TIE SYSTEM FOR RETROFIT ON EXISTING STRUCTURES

(76) Inventor: Thomas Thompson, 92-643 Kokoie Pl., Makakilo, HI (US) 96706

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,267

(22) Filed: Nov. 10, 1997

Related U.S. Application Data

(63) Continuation of application No. 08/191,852, filed on Feb. 2, 1994, now abandoned.

(51) Int. Cl.[7] .................................................. E04B 1/38
(52) U.S. Cl. ............................ 52/715; 52/712; 52/92.2; 52/93.2; 403/403
(58) Field of Search ............................... 52/92.2, 93.2, 52/712, 715; 403/403

(56) References Cited

U.S. PATENT DOCUMENTS

| | | |
|---|---|---|
| 4,714,372 A | 12/1987 | Commins |
| 4,896,985 A * | 1/1990 | Commins ................ 52/712 X |
| 5,109,646 A | 5/1992 | Colonias et al. |
| 5,150,553 A * | 9/1992 | Commins et al. ......... 52/712 X |
| 5,257,483 A * | 11/1993 | Netek ...................... 52/93.2 X |
| 5,335,452 A | 8/1994 | Taylor |
| 5,345,716 A | 9/1994 | Caplan |
| 5,347,775 A | 9/1994 | Santos |
| 5,355,640 A | 10/1994 | Frye |
| 5,383,315 A | 1/1995 | Birs |
| 5,390,455 A | 2/1995 | Antolini |
| 5,423,156 A | 6/1995 | Nellessen, Jr. |

OTHER PUBLICATIONS

Mitigating damages in Hawaii's hurricanes; Wallace; Aug. 1993.

* cited by examiner

*Primary Examiner*—Carl D. Friedman
*Assistant Examiner*—Yvonne M. Horton

(57) ABSTRACT

Metal connector ties for tying together the roof covering, roof sheathing, roof beams, top plate, and outside walls of existing wood structures against shear and tensional forces from strong winds or seismic activity. Two different sheet metal connectors can be used to tie together the roof beams, top plate, and outside walls by fasteners driven through the connectors, around obstructing wood trim and utility wires, and into the wood members. The roof covering, roof sheathing, and roof beams are tied together by metal connectors, rods through the roof, standard pipe connections and guide wires, that are tied to the roof beams by fasteners. All ties are used on the exterior of existing buildings without dismantling any wood trim or utility wires.

4 Claims, 20 Drawing Sheets

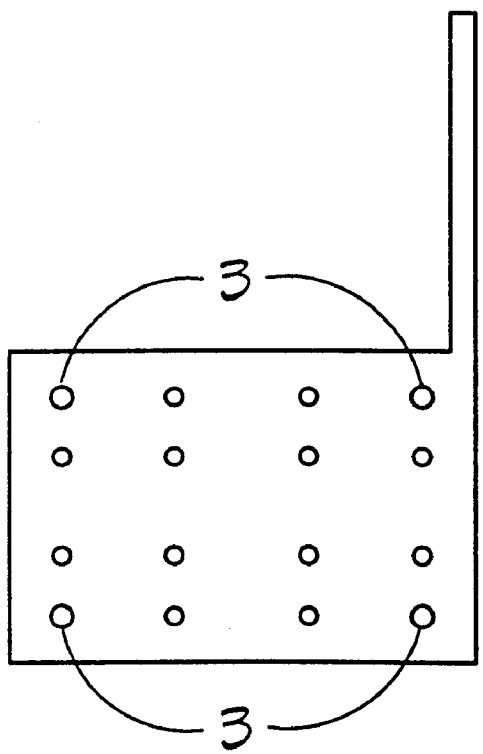
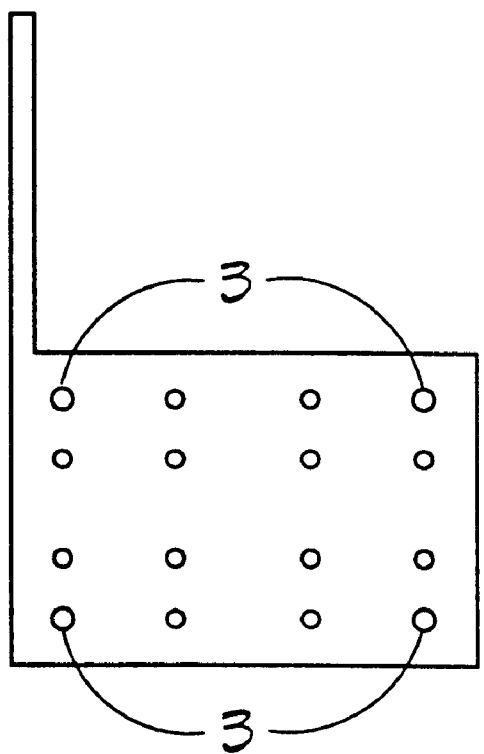
FIG. 3B                    FIG. 3A

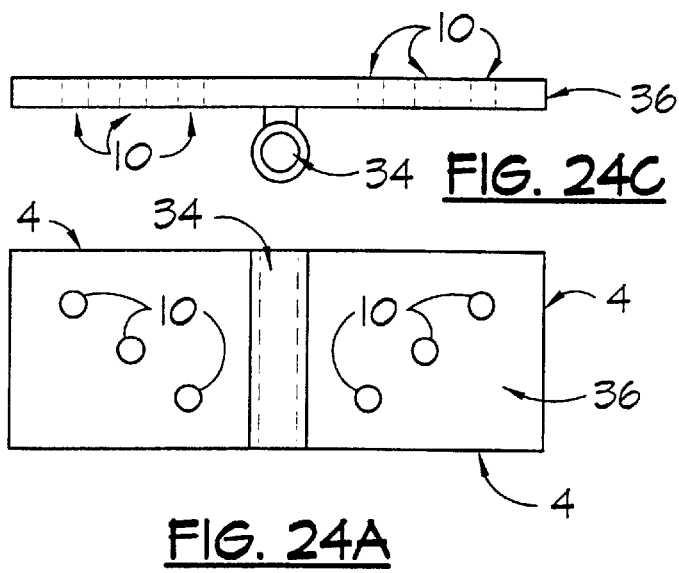
FIG. 24C
FIG. 24A
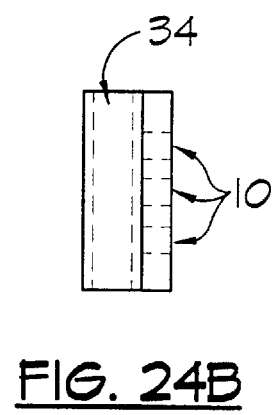
FIG. 24B
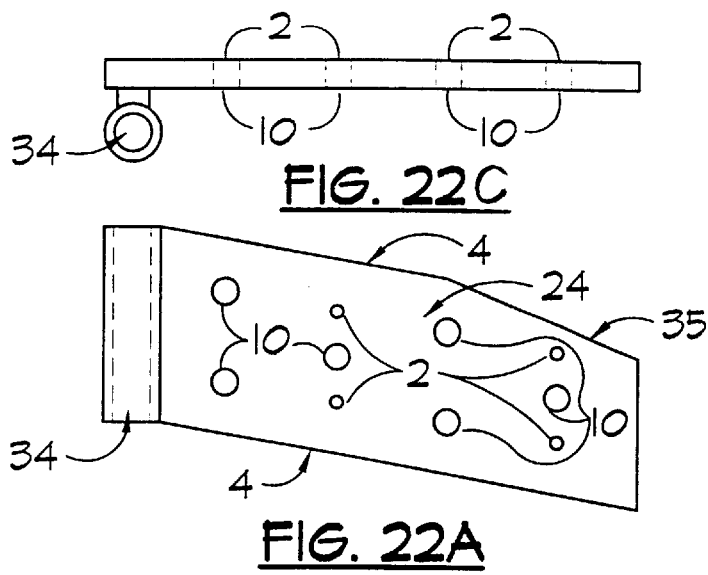
FIG. 22C
FIG. 22A
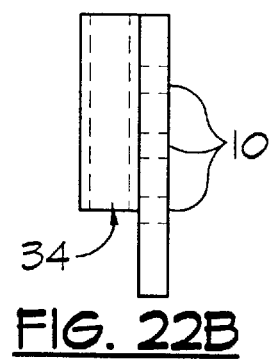
FIG. 22B
FIG. 21C
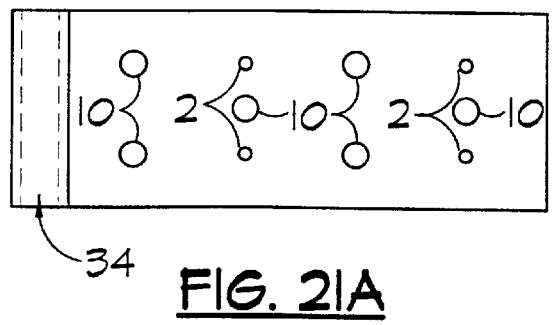
FIG. 21A
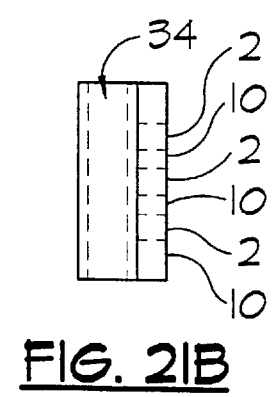
FIG. 21B

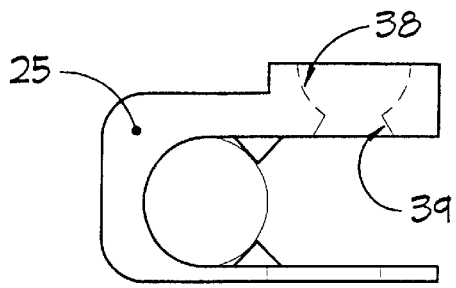
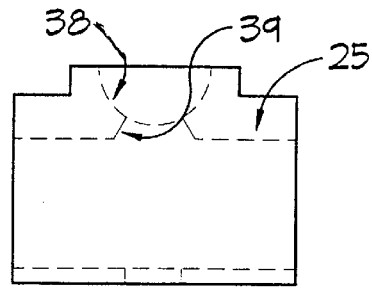
FIG. 23B    FIG. 23C
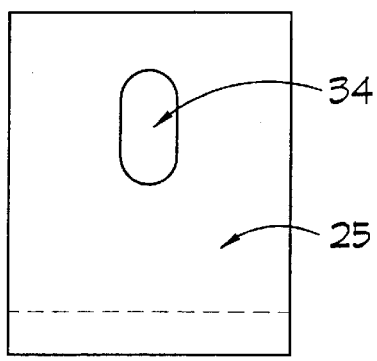
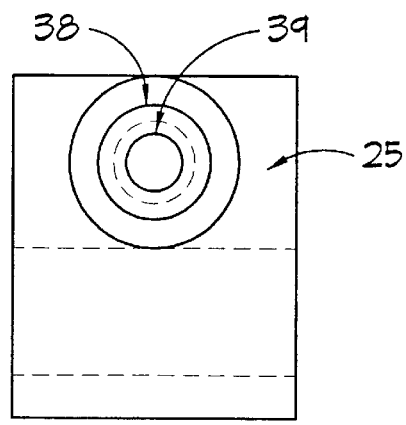
FIG. 23D    FIG. 23E
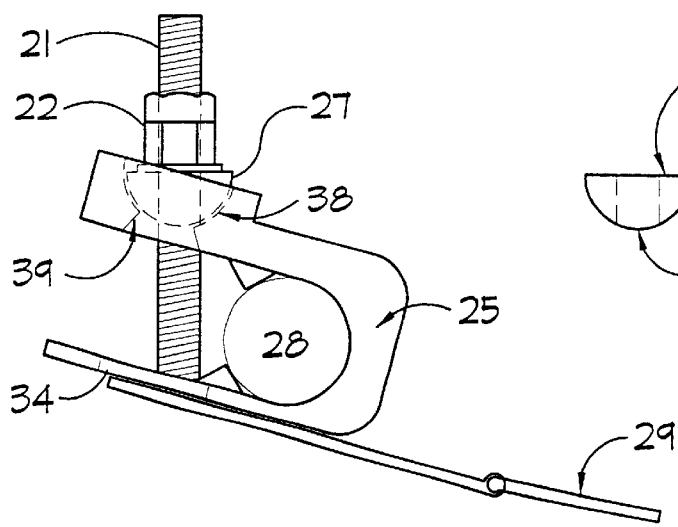
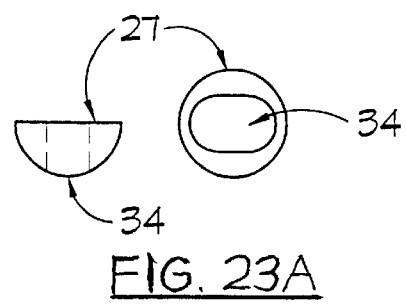
FIG. 23    FIG. 23A

HURRICANE TIE SYSTEM FOR RETROFIT ON EXISTING STRUCTURES

This application is a continuation of application Ser. No. 08/191,852 filed Feb. 2, 1994 which application is now abandoned.

BACKGROUND—Field of the Invention

This invention relates to metal connectors for tying together wood members in existing wood structures, and in particular, holding down roof structures against high winds including hurricanes.

In warm climates that are prone to hurricanes, existing single-family houses are typically constructed of light-framed timber. Newer houses have timber stud walls (double wall construction) and timber roof framing with plywood or wood slats. Most of the roof rafters or trusses are not attached to the exterior walls with metal hurricane fasteners. Older houses are usually of single-wall construction with timber-roof framing and non-structural corrugated metal roofing. (See Structural Engineers Association, 1993, p. III-22).

Studies of the damage that the 1992 Hurricane Iniki caused in Kauai, Hawaii, showed that there was extensive loss of roof covering (wood and asphalt shingles, sheet metal, and clay tiles), and sheathing (plywood, tongue-and-groove decking, and metal decking) due to high wind and inadequate attachment. The failed attachments were at the nailing of the roof covering to the sheathing; the stapling of the plywood sheathing; the nailing of metal decking to the battens and the battens to the purlins (trusses); and the nailing and splicing of tongue-and-groove decking. This caused dangerous wind-blown debris and resulted in extensive water damage to the buildings' contents. Many of the failed connections were "toe-nailed" together, (See Structural Engineers Association, 1993, p. III-22).

Engineers have recommended that all houses being built in Hawaii be in compliance of the current (Building) Code and the continuous load transfer path from roof to foundation should be integrated into all stages of building. Use of (prior art) hurricane clips does not, in and of itself, ensure successful building performance. (See FEMA publication FIA-23 p. 80).

BACKGROUND—Description of Prior Art

Prior to this invention, the outside wall sheathing had never been used before to form a continuous load transfer path from the roof to foundation. When building houses in a tropical climate, house foundations are very shallow or lacking completely. This invention uses the outside wall sheathing to tie the rafter, top plate, and outside wall together in order to resist uplift forces.

Recent unpublished research on wooden building performance during earthquakes shows that the outside wall sheathing is the most important structural member. If the sheathing comes loose from the wall when a building is shaken during earth tremors, the building can collapse. This invention helps hold the sheathing to the outside wall. None of the prior art holds the outside sheathing to the wall.

A number of connectors have been developed to tie together the roof rafter and the top plate, but these previous connectors were made to be used during construction of the structure. These connectors cannot be retro-fitted to existing structures without extensive dismantling or damage to inside wall board or outside trim. Prior tie connectors are also limited to the number of roofing and structural members that can be tied together.

The roof lock in U.S. Pat. No. 1,452,599 to Hames, March 1922, and the dock bracket in U.S. Pat. No. D.290,223 to Westerheim, June 1987 did not tie the rafter to the top plate and outside sheathing. The hurricane tie in U.S. Pat. No. 4,714,372, December 1987, and snugging connector in U.S. Pat. No. 4,896,985, January 1990, both to Commins, can tie the rafter to the top plate in the skeleton structural framework of new construction. They can not be used as a retrofit on existing houses; they did not tie the sheathing to the top plate and rafter; they did not go around the frieze board; they did not tie into a stud or top plate directly underneath a rafter; and they did not tie together two 2×4's of the top plate.

The bearing connector in U.S. Pat. No. 5,109,646, May 1992, to Colonias et al. is used to carry roof loads, but can tie together a rafter, top plate, and two 2×4's of the top plate together in the skeleton structural framework of new construction. This connector can not be used as a retrofit on existing houses; it did not tie the sheathing to the top plate and rafter; it did not go around the frieze board; and it did not tie into a stud or top plate directly underneath a rafter.

The building construction ties in U.S. Pat. No. 2,300,113, to Faber, October 1942, can tie the rafter to the joist and wall stud in the skeleton structural framework of new construction. They can not be used as retrofit on existing houses; they did not tie the sheathing to the top plate and rafter; they did not tie the rafter and top plate together; they did not go around the frieze board; and they did not tie together two 2×4's of the top plate.

The free gusset metal ledger hanger in U.S. Pat. No. 4,353,664, to Gilb, October 1982, is used to provide ledger support around the inside perimeter of buildings or at internal concrete or masonry walls. This connector can not be used as a retrofit on the outside of existing houses; it did not tie the sheathing to the top plate and rafter; it did not tie together a rafter and top plate; it did not go around the frieze board; it did not tie into a stud or top plate directly underneath a rafter; and it did not tie together two 2×4's of the top plate.

The wall tie in United Kingdom patent 2,096,664, to Durrant, October 1982, is used to strengthen mortar joints in brick walls. This connector can not be used as a retrofit on the outside of existing wood houses; it did not tie the sheathing to the top plate and rafter; it did not tie together a rafter and top plate; it did not go around the frieze board; it did not tie into a stud or top plate directly underneath a rafter; and it did not tie together two 2×4's of the top plate.

The connecting plate for wood members in Germany patent 238,822, to Sauer, March 1986, is used to connect planks, boards, or strips, using bending slots and nail holes. This connector, by its large bending slots, is a weak connector. Bending this connector weakens the metal, especially since most carpenters would hammer the connection to make it fit on planks and boards. This connector is useful for attaching together boards that intersect at odd angles, that is, not equal to 90 or 45 degrees. This connector may be used as a retrofit on existing houses, but was intended for attaching beams and blanks in the skeleton structural framework of new construction. It did not tie the sheathing to the top plate and rafter; it did not go around the frieze board; it did not tie into a stud or top plate directly underneath a rafter; and it did not tie together two 2×4's of the top plate.

The metal connectors in Switzerland patent 214,358, April 1941 is used to connect wood and metal members together. The connectors can tie I-beams, angle iron, and wood boards to metal frames in skeleton structural framework of new construction. They can not be used as retrofit on existing houses; they did not tie the sheathing to the top plate and rafter; they did not tie the rafter and top plate together; they did not go around the frieze board; and they did not tie together two 2×4's of the top plate.

The apparatus and method for securing a building during high winds in U.S. Pat. No. 5,319,986 to Winger, June 1994, is used to secure several of the roof rafters to the ground by cables and anchors. This system is employed only when high winds are expected, as the cables must be extended and attached to the ground anchor manually. In a post-and-beam constructed house where the inside rafters are exposed, the cables and attaching hardware are exposed to view. Cables can kink, stretch, rust in place, and break. This system did not tie down the roof sheathing or roof shingles. This system will not work if the homeowner is not home to secure the anchoring cables. It cannot work in areas where tornadoes can occur without warning, especially if the home owner is sleeping or is seeking shelter in the basement or interior room. The system requires extensive and expensive carpentry work and expensive hardware. This system cannot tie into the hot water system or heat hot water by solar energy.

Winger's U.S. Pat. No. 5,319,896 does not securely tie together the rafter and ridge plate, and tie them straight down to the ground. It cannot use the house foundation as an anchor member. This apparatus is anchored to the ground at an acute angle instead of straight down, which means that more obstructions may be in the way of a ground anchor. Because of the acute angle of the ground anchor, and its angle toward the house, a portable drill could not be used to prepare the hole or install the ground anchor. Because of the acute angle of the ground anchor, it cannot be installed as deep as an anchor that goes straight down.

The house anchor in U.S. Pat. No. 1,864,403, to Bradley, June 1932, uses cables and ground anchors to secure the roof to the ground. This system cannot tie into the hot water system or heat hot water by solar energy. It did not tie together the rafter and ridge plate or tie them straight down to the ground; since the rafter and ridge plate are not secured together and tied to the ground on the gable end of the house, the house is vulnerable to winds on the side of the house that can push or pull and separate the gable end of the rafter plate to ridge plate connection. Cables can stretch and break. Parts of the house anchor include eye-bolts and cable guides which can pull out from wood when subjected to perpendicular pulling forces as from strong winds.

The exterior anchoring apparatus for surface sheets in U.S. Pat. No. 1,864,403, to Bradley, March 1967, uses metal rods and clamps to secure exterior sheathing to a roof. This system cannot be retrofit to an existing roof. It did not tie the sheathing securely to the rafter and ridge board. It does not tie the roof securely to the ground. It did not heat water by solar power.

OBJECTS AND ADVANTAGES

Objects of this invention are to tie together the roof and supporting structures of an existing building, and to make the structure resistant to strong winds. It is a further object of this invention that the ties be inexpensive and simple. It is a still further object that the invention be simple to install, but have equal or more strength than hurricane ties that are installed on new construction. It is a still further object of this invention that the roof covering, roof sheathing, roof beams, top plate and outside walls of an existing structure be tied together against shear and tensional forces from strong winds.

A further objective is to provide for the installation of this invention on the outside of existing structures. Further objects and advantages of my invention will become apparent from a consideration of the drawings and ensuing description.

SUMMARY OF THE INVENTION

These and other objectives of the invention are achieved by a system of simple and economical tie connectors, that tie together the roof covering, roof sheathing, roof beams, top plate, and outside walls of an existing building against shear and tensional forces from strong winds. Several of the ties can be installed by a practical homeowner.

Because this invention can be retro-fitted to the outside of existing structures, it can bring many houses "up to code" or greater than new construction that use existing hurricanes ties. The ties do not have to be installed all at once, but can be installed a few at a time as finances require, however, installing all of the ties will provide the most protection against strong winds. In hurricane-prone areas, installation of this invention may decrease insurance premiums.

DRAWING FIGURES

FIG. 3A is front view of a right-handed tie "A" shown in FIG. 1.

FIG. 3B is front view of a left-handed tie "A" shown in FIG. 1.

Figure 9:
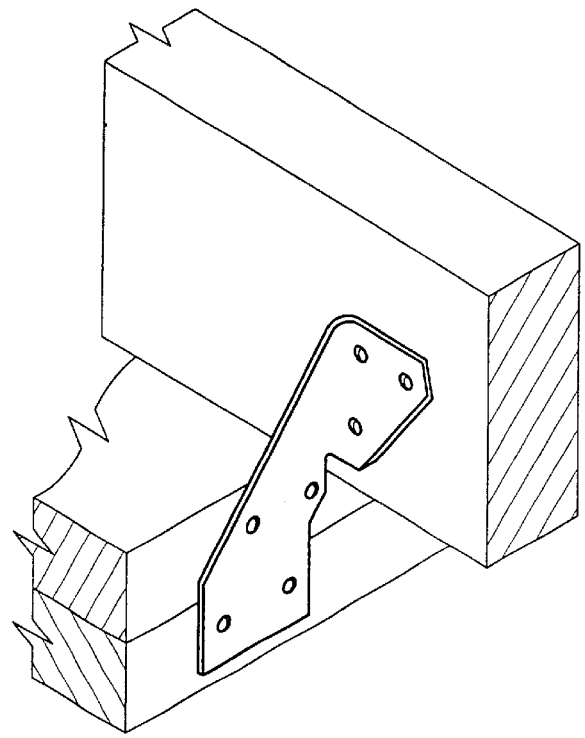

FIG. 9 is a Prior Art U.S. Pat. No. 4,714,372 by Commins, December 1987.

Figure 10:
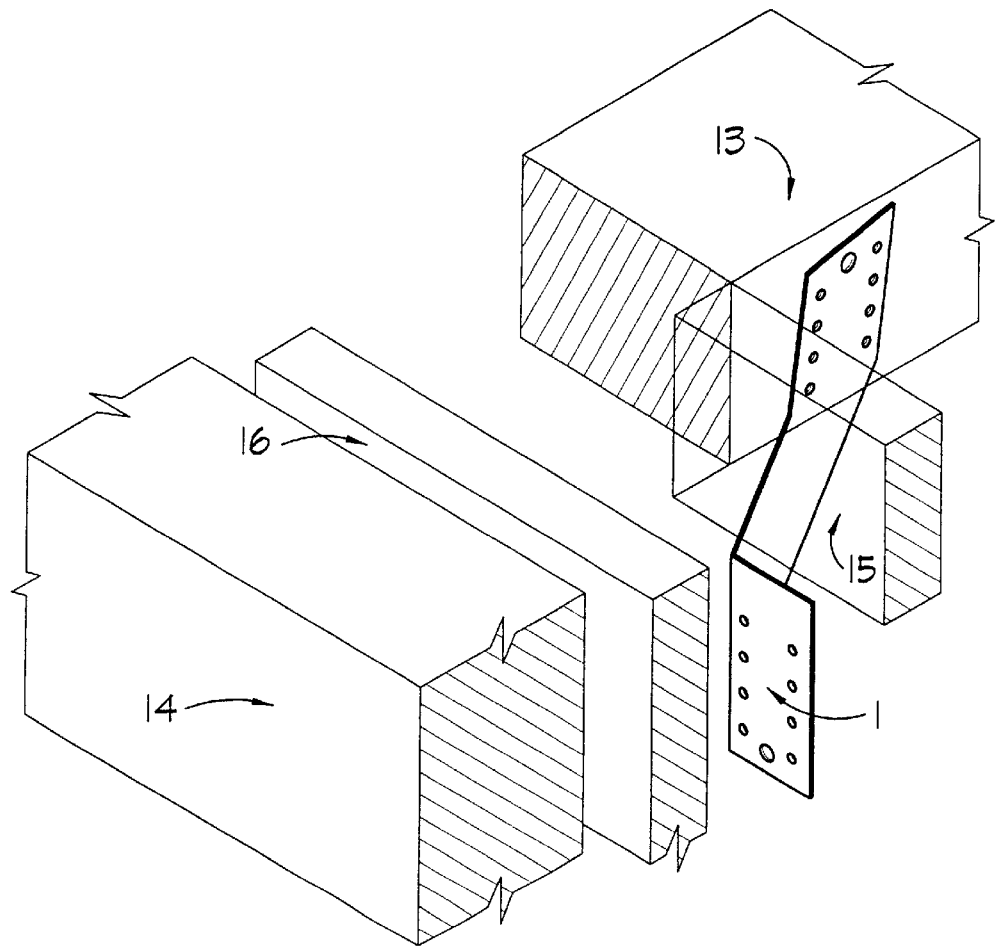

FIG. 10 is a perspective view of tie "B" of the present invention.

Figure 11:
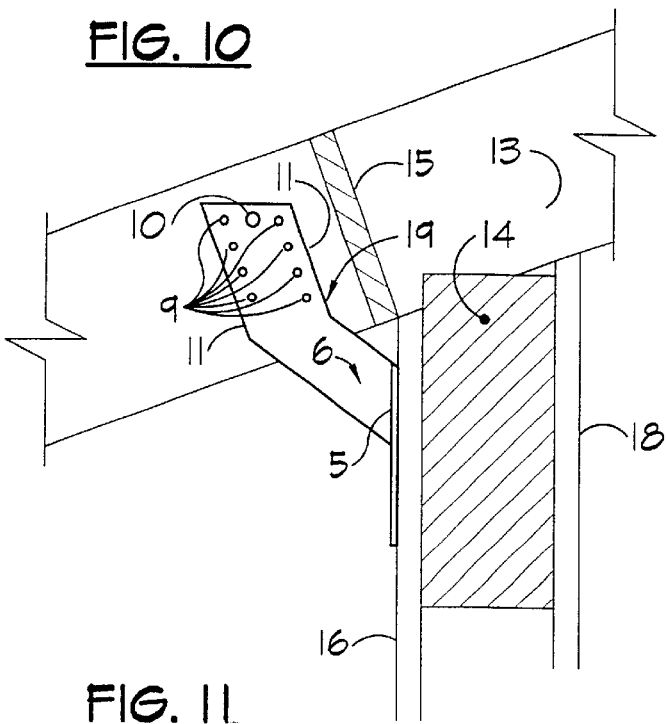

FIG. 11 is a side view of tie "B" of the present invention shown in FIG. 10.

Figure 12:
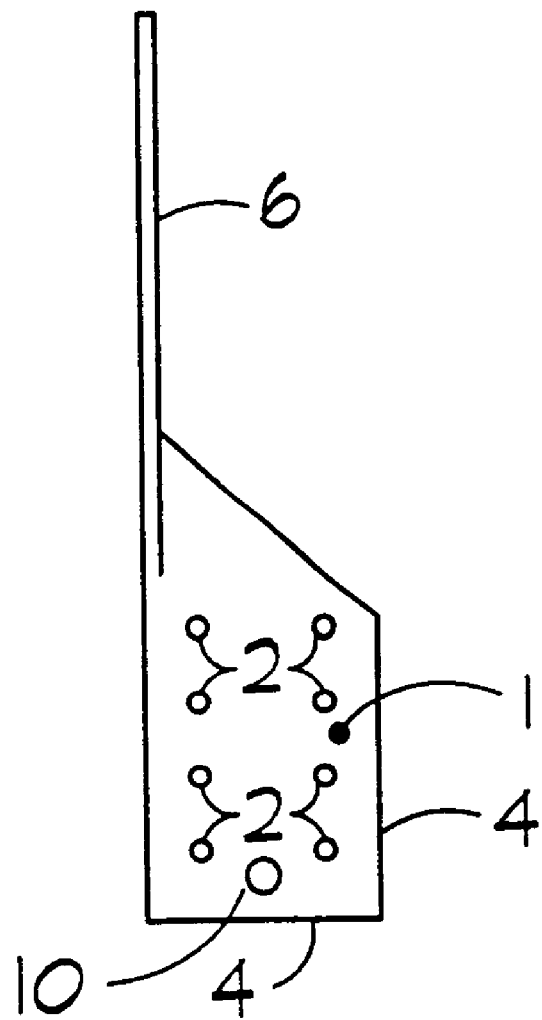

FIG. 12 is front view of tie "B" shown in FIG. 10.

Figure 13:
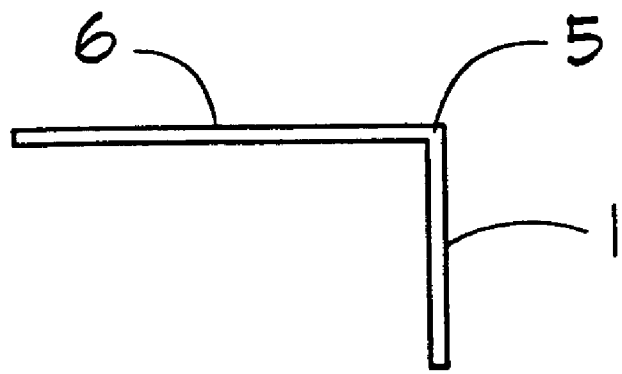

FIG. 13 is a top view of tie "B" shown in FIG. 10.

Figure 14:
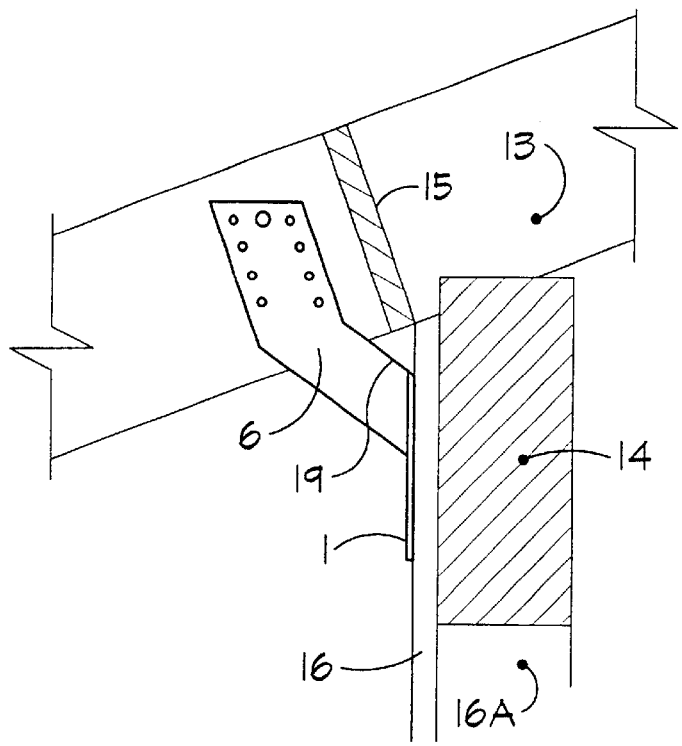

FIG. 14 is a side view of tie "B" installed on a timber plate wood structure.

Figure 15:
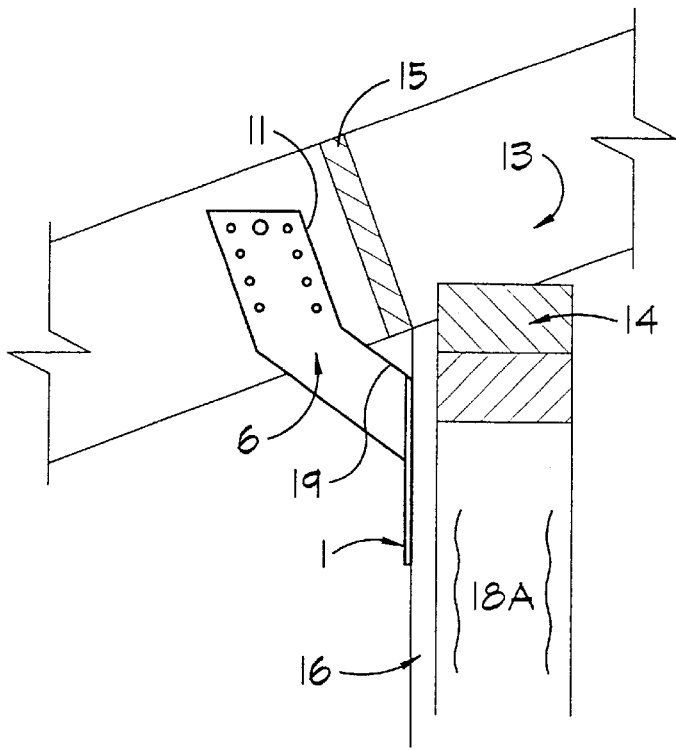

FIG. 15 is a side view of tie "B" installed on a double plate wood structure.

Figure 16A:
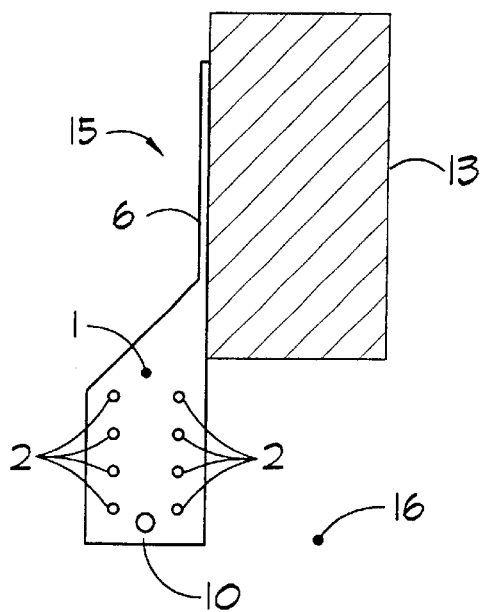

FIG. 16A is a front view of a left-handed tie "B" installed on a wood structure.

Figure 16B:
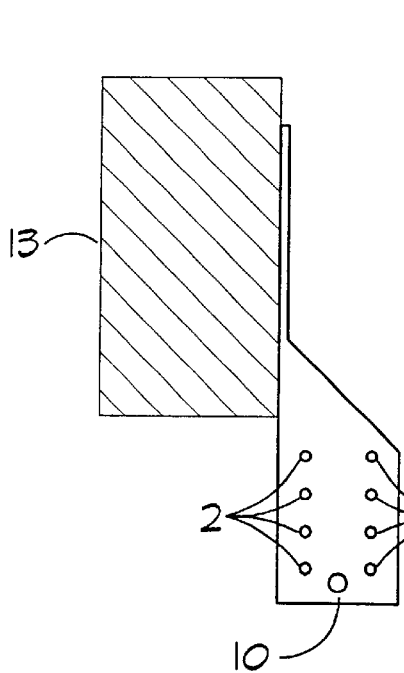

FIG. 16B is a front view of a right-handed tie "B" installed on a wood structure.

Figure 16C:
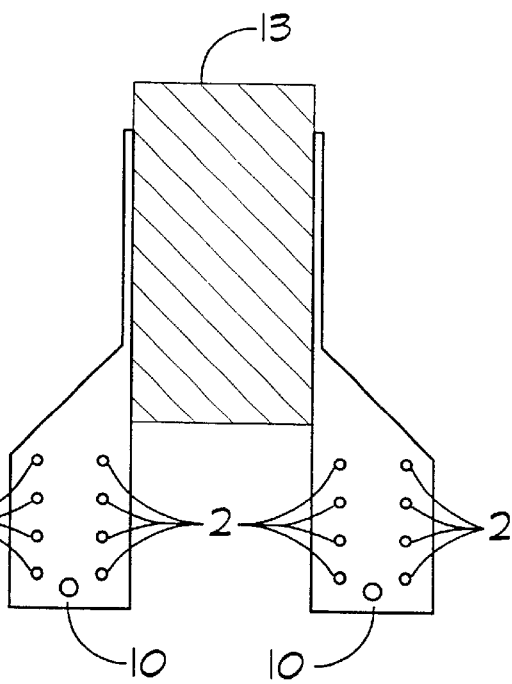

FIG. 16C is a front view of a right- and left-handed tie "B" installed on a wood structure.

Figure 17:
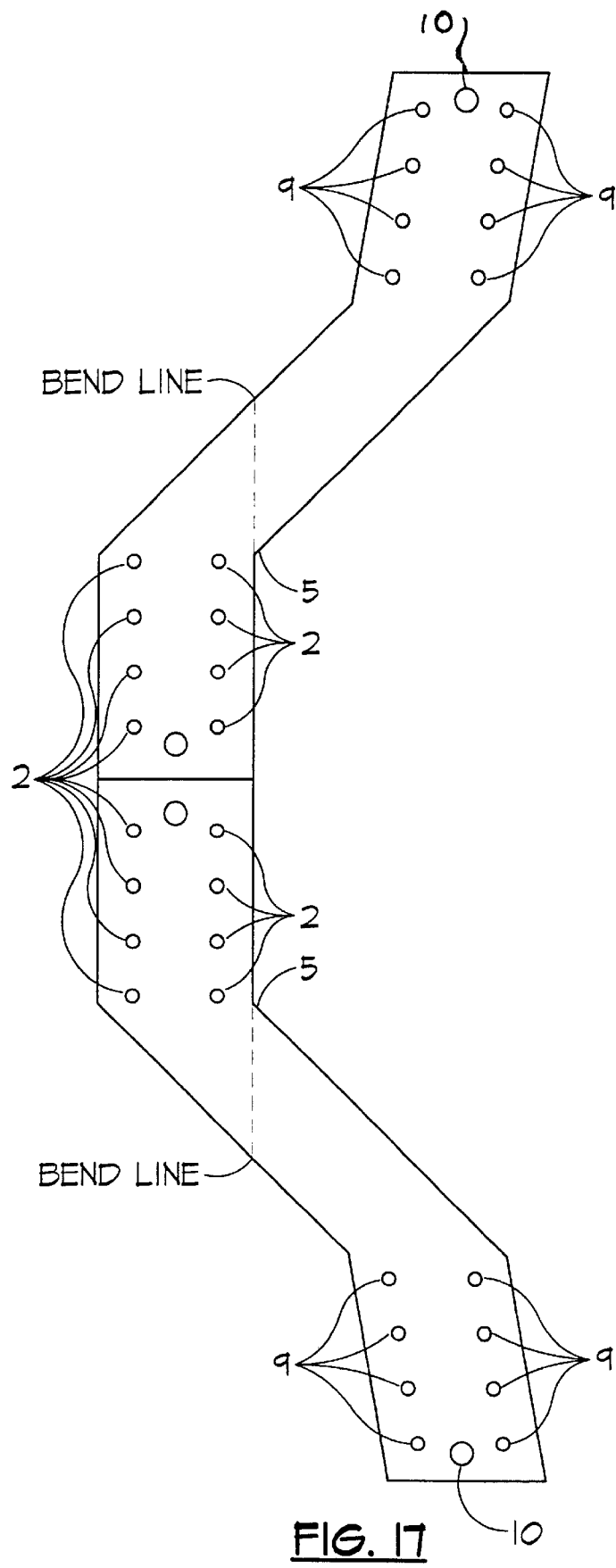

FIG. 17 is a plan view of a pair of right- and left-handed tie "B" in blank form, prior to bending and separation.

Figure 18:
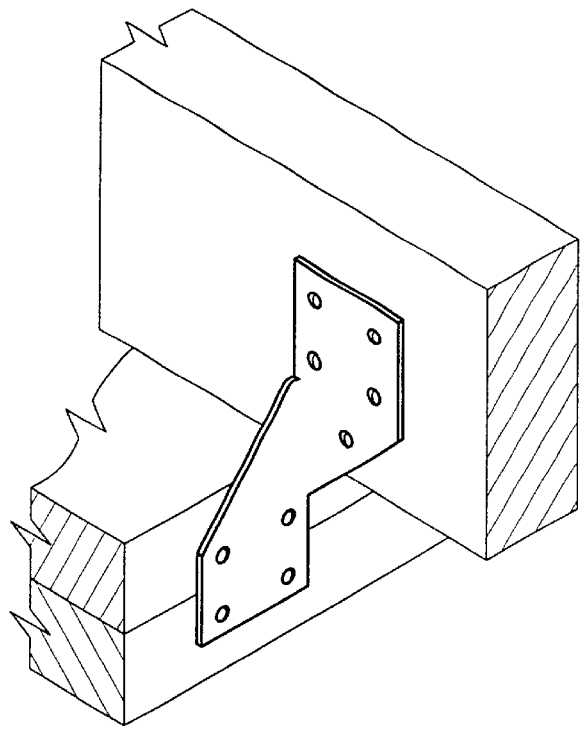

FIG. 18 is a Prior Art perspective view of a hurricane tie for new construction.

Figure 19:
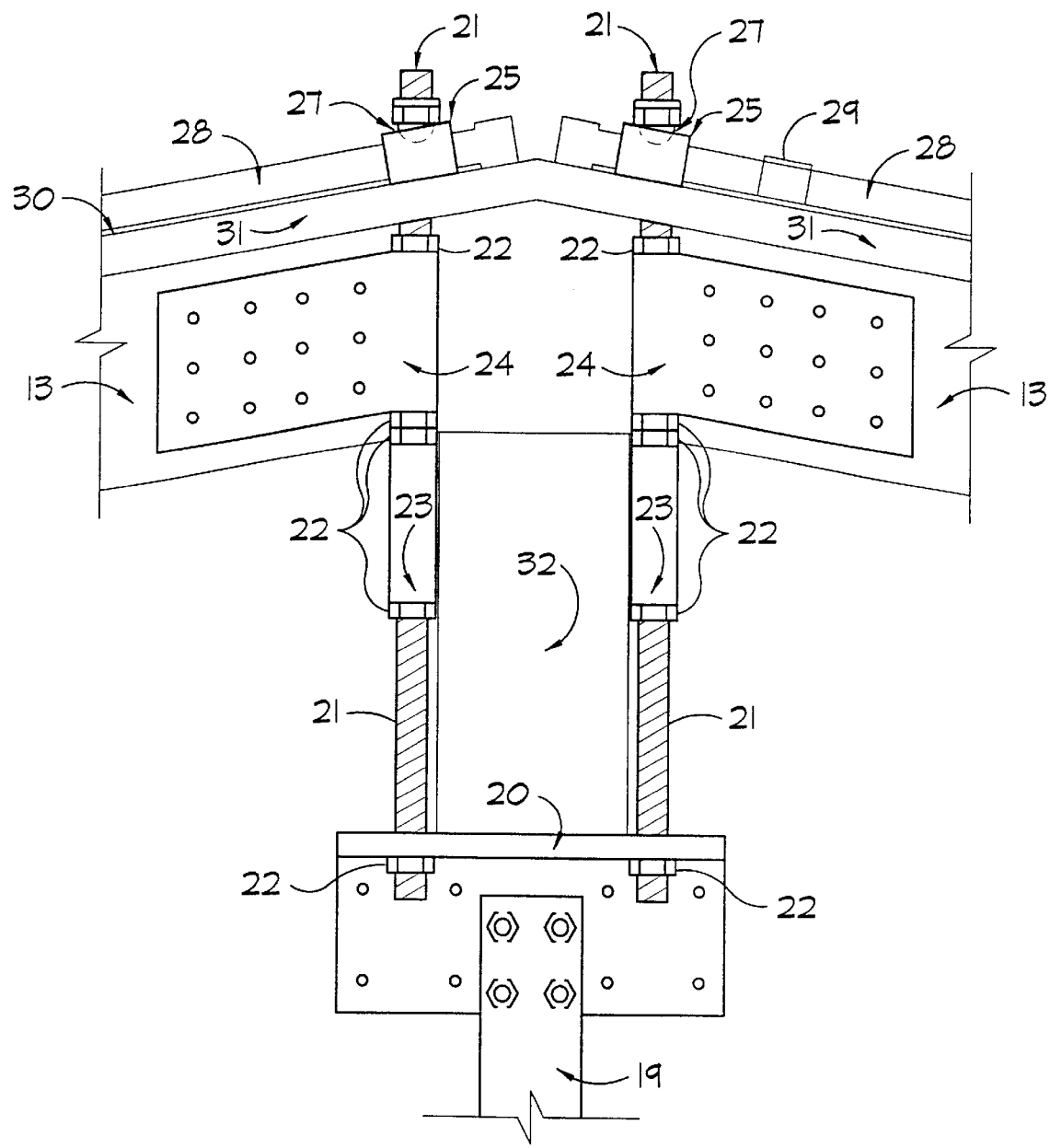

FIG. 19 is a front view of tie "C" of the present invention.

Figure 20A:
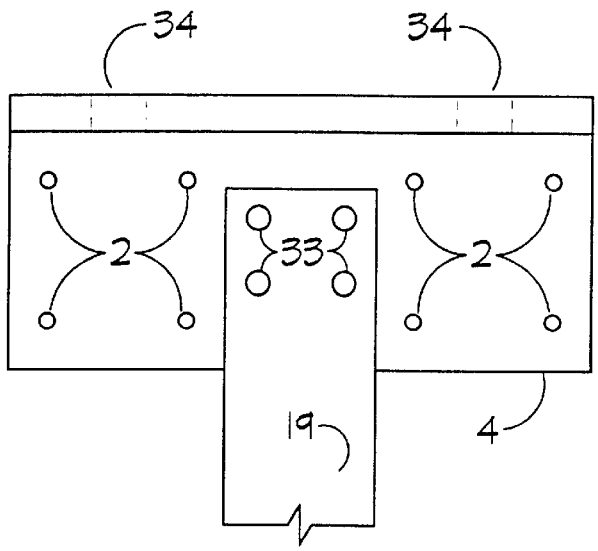

FIG. 20A is a front view of the angle iron hold down of tie "C" shown in FIG. 19.

Figure 20B:
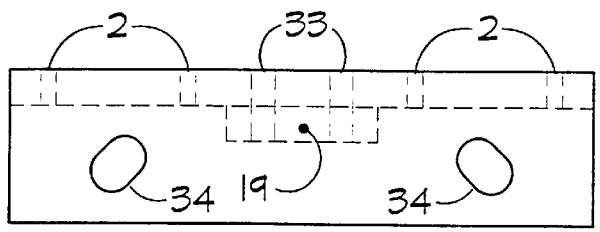

FIG. 20B is a top view of the angle iron hold down.

Figure 20D:
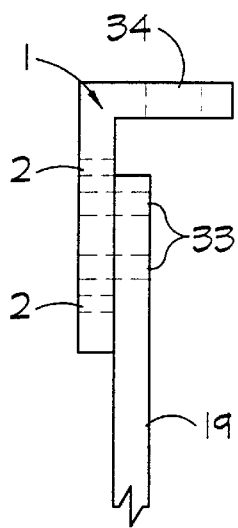
Figure 20C:
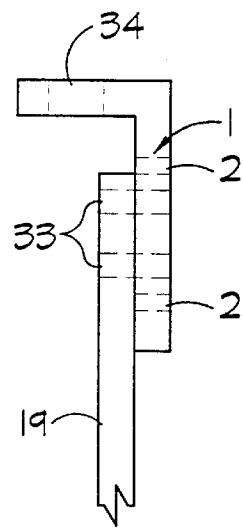

FIG. 20C is a left side view of the angle iron hold down.

FIG. 20D is a right side view of the angle iron hold down.

FIG. 21A is a front view of a ridge plate hold down of tie "C" shown in FIG. 19.

FIG. 21B is a side view of a ridge plate hold down.

FIG. 21C is a top view of a ridge plate hold down.

FIG. 22A is a front view of a right-handed rafter plate hold down of tie "C" shown in FIG. 19.

FIG. 22B is a side view of a right-handed rafter plate hold down.

FIG. 22C is a top view of a right-handed rafter plate hold down.

Figure 22F:
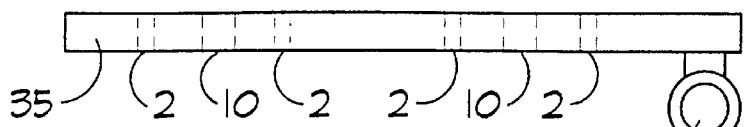
Figure 22D:
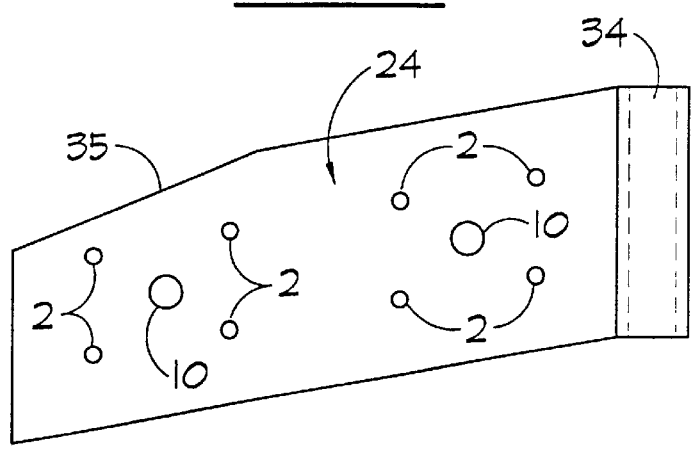

FIG. 22D is a front view of a left-handed rafter plate hold down.

Figure 22E:
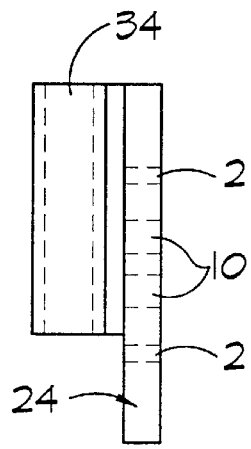

FIG. 22E is a side view of a left-handed rafter plate hold down.

FIG. 22F is a top view of a left-handed rafter plate hold down.

FIG. 23 is a front view of a roof fastener hold down, shown installed above a rafter.

FIG. 23A shows a side view (left) and top view (right) of a roof fastener hold down ball of tie "C" shown in FIG. 19.

FIG. 23B is a side view of a roof fastener hold down.

FIG. 23C is a front view of a roof fastener hold down.

FIG. 23D is a bottom view of a roof fastener hold down.

FIG. 23E is a top view of a roof fastener hold down.

FIG. 24A is a front view of a midspan hold down.

FIG. 24B is a side view of a midspan hold down.

FIG. 24C is a top view of a midspan hold down.

Figure 25B:
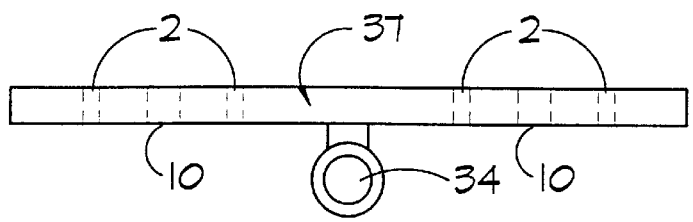
Figure 25A:
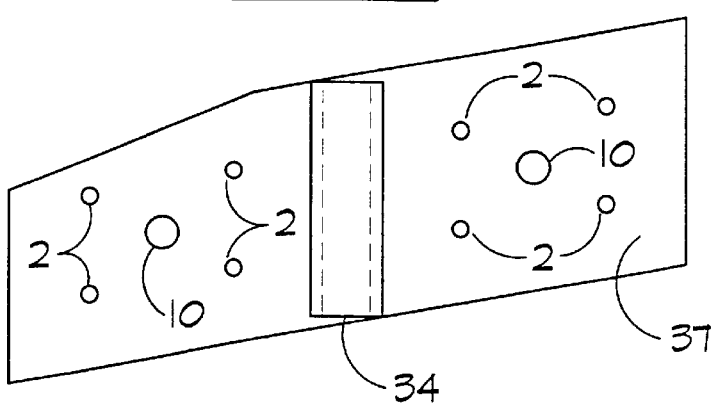
Figure 25C:
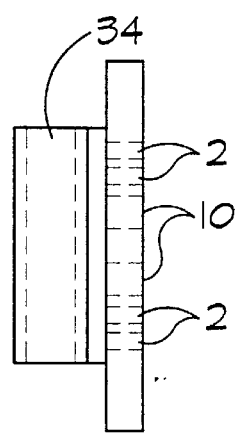
Figure 25E:
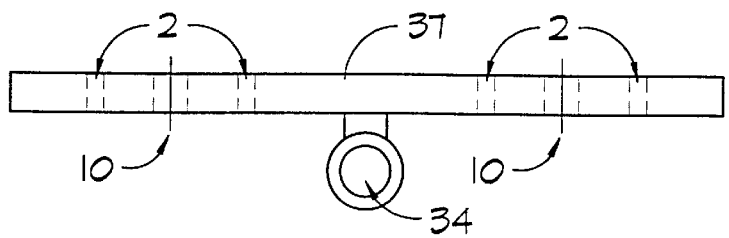
Figure 25D:
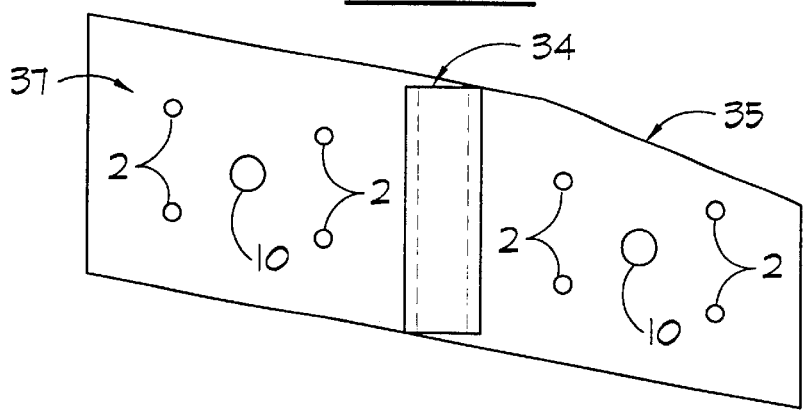
Figure 25:
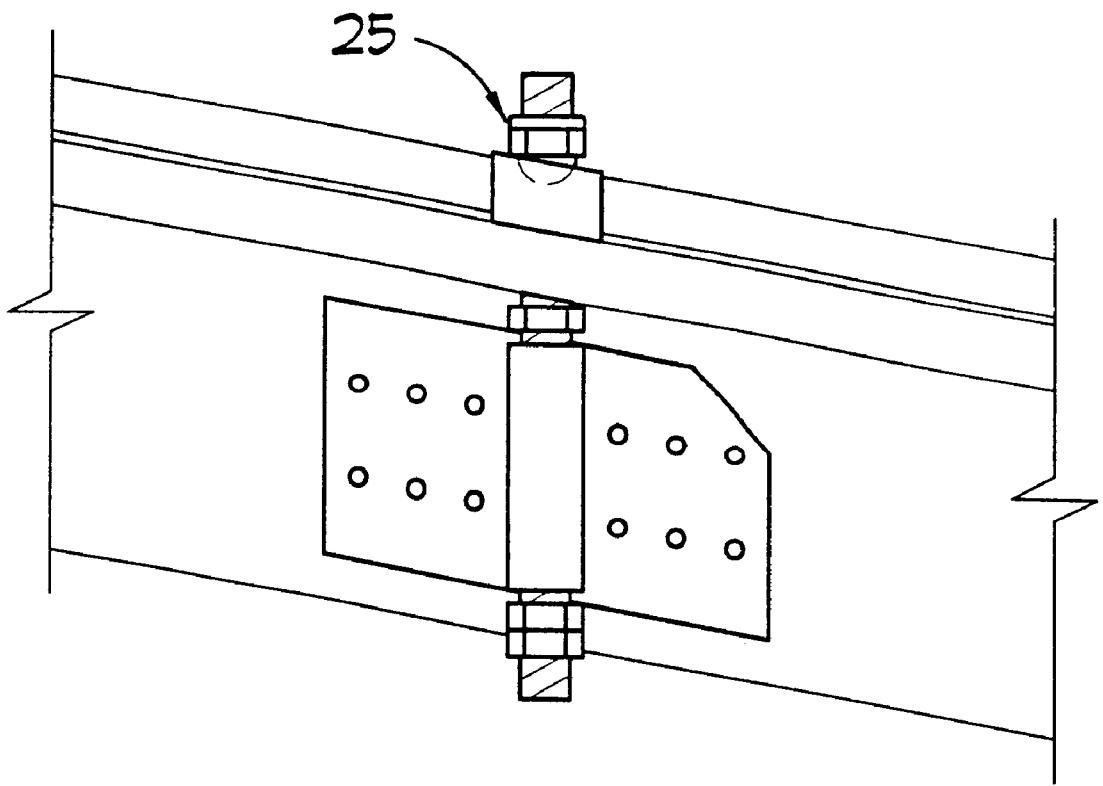

FIG. 25 is a front view of a right roof end hold down.

FIG. 25A is a front view of a left roof end tie.

FIG. 25B is a top view of a left roof end tie.

FIG. 25C is a side view of a left roof end tie.

FIG. 25D is a front view of a right roof end tie.

FIG. 25E is a top view of a right roof end tie.

Figure 26B:
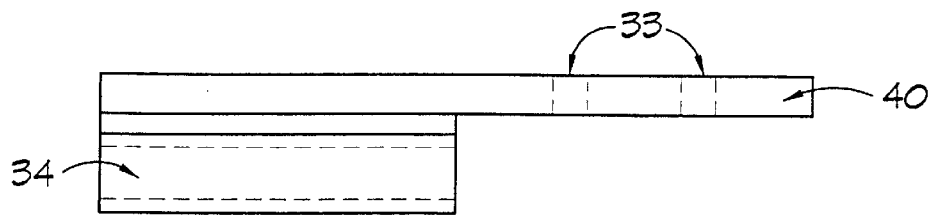
Figure 26A:
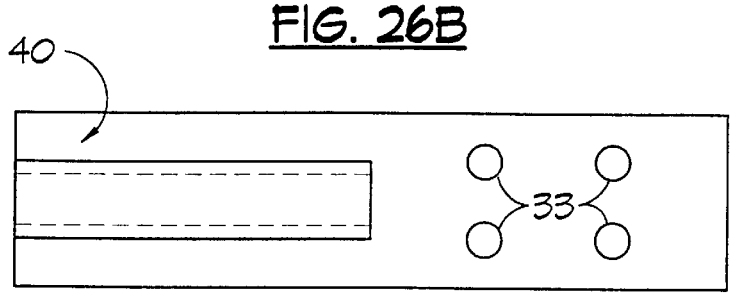
Figure 26C:
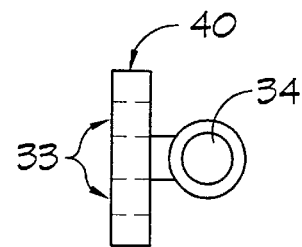
Figure 26:
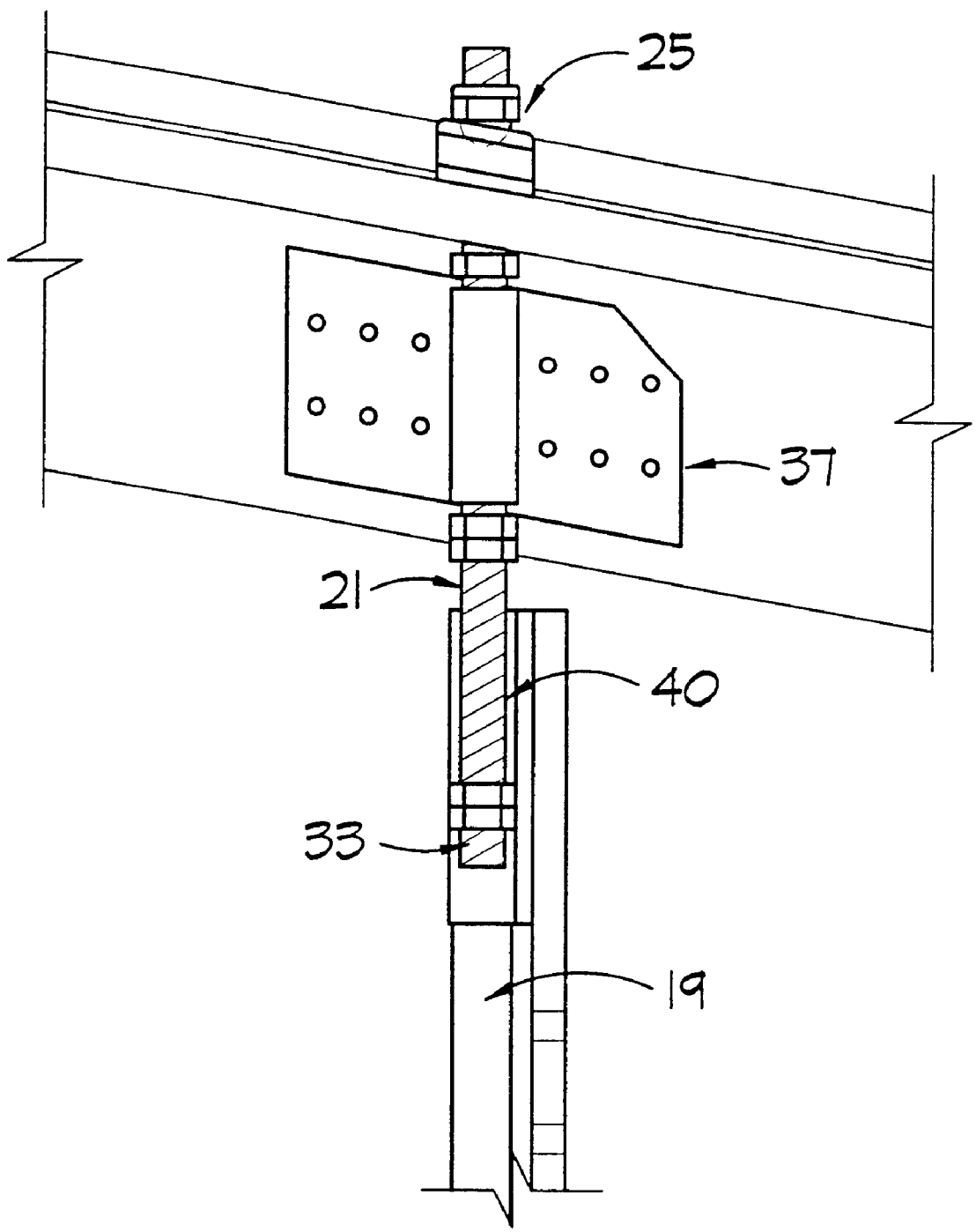

FIG. 26 is a front view of a roof to foundation tie, shown installed with a roof end hold down.

FIG. 26A is a front view of a roof to foundation tie.

FIG. 26B is a top view of a roof to foundation tie.

FIG. 26C is a side view of a roof to foundation tie.

Figure 26D:
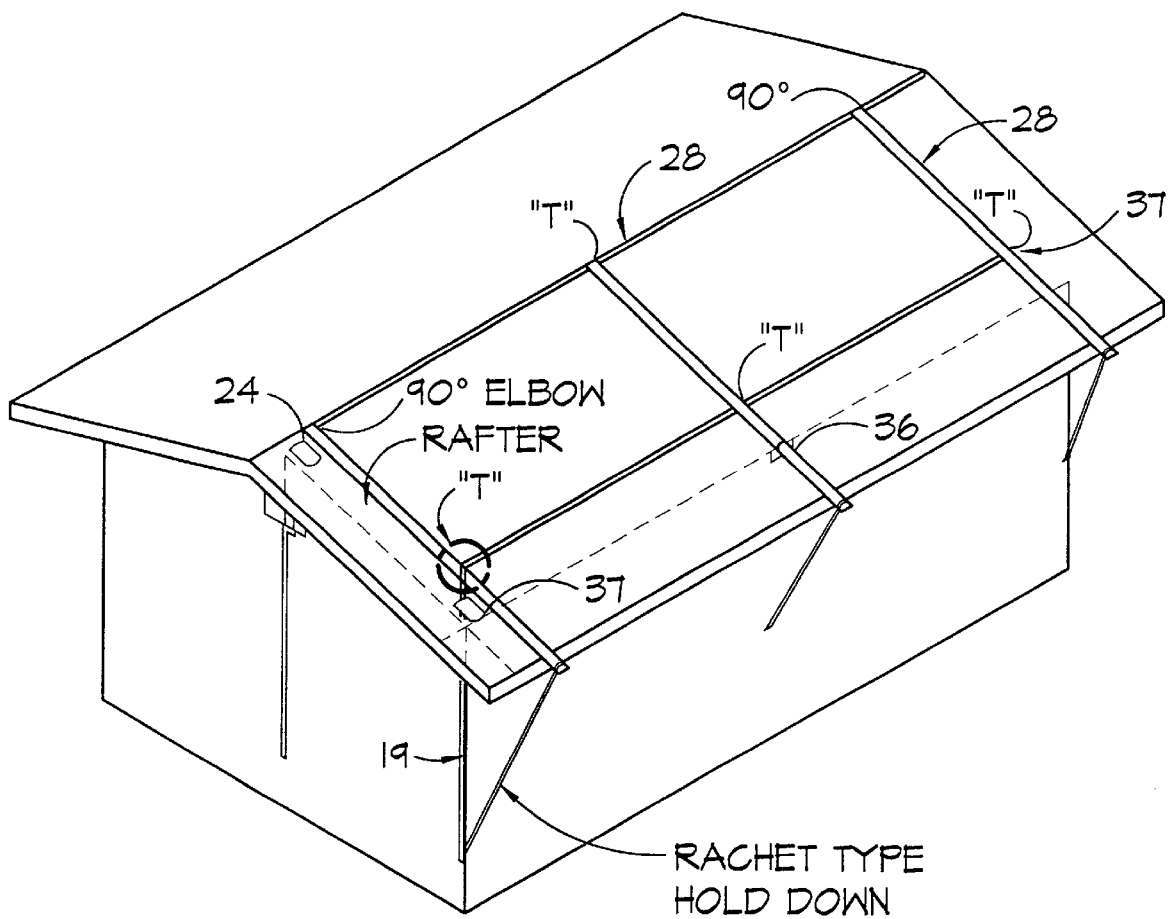

FIG. 26D is an aerial view of a roof showing previously mentioned ties in place.

REFERENCE NUMERALS IN DRAWINGS

1. Base members
2. Nail holes
3. Slotted nail holes
4. Base side edges
5. Right-angle bend
6. Web member
6A. Inner offset or joggle
6B. Outer offset or joggle
7. Inner radius
8. Outer radius
9. Nail holes
10. Lag bolt hole
11. Angled sides
12. Top side
13. Rafter
14. Top plate
15. Frieze board
16. Outside wall sheathing
16A. Wall post
17. Web bottom
18. Gypsum wall board
18A. Wall stud
19. Strap
20. Angle iron
21. Thread rod
22. Locking nut
23. Ridge plate
24. Rafter plate
25. Roof fastener
26. Caulking
27. Ball
28. Pipe
29. Net connector
30. Roof sheathing
31. Roofing material
32. Ridge beam
33. Bolt hole
34. Hole for threaded rod
35. Notched cut-out
36. Midspan tie
37. Roof end tie
38. Socket
39. Flared hole
40. Roof to foundation tie

DESCRIPTION AND OPERATION OF THE PREFERRED EMBODIMENT

Figure 1:
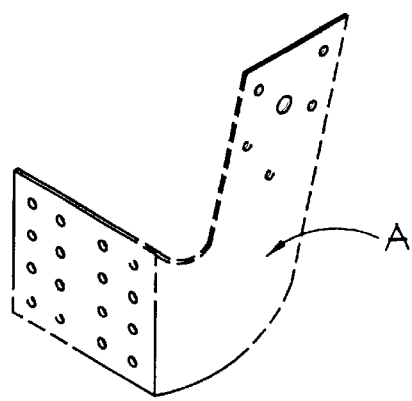
FIG. 1 is a perspective view of the present invention.

Refer now to FIG. 1 which is a perspective drawing of a preferred embodiment of tie "A" of the invention. The unitary sheet metal tie "A" consists of a rectangular base member 1 with straight nail holes 2, slotted up and down nail holes 3, and straight sides 4. The base member has a right-angled bend 5 that includes a generally trapezoidally-shaped web member 6, that is offset to the axis of the right-angled bend by a radius 7 that is about one-half of the width of the base member. The outer radius 8 is about one and one-half of the width of the base member.

The web member 6 has nail holes 9 and a lag-bolt hole 10 in the upper part of the member. The sides 11 are generally straight and parallel, and are tilted between 10 and 20 degrees away from the axis of the right angle bend. The top side 12 of the web member is generally parallel to the bottom of the base member.

Figure 1A:
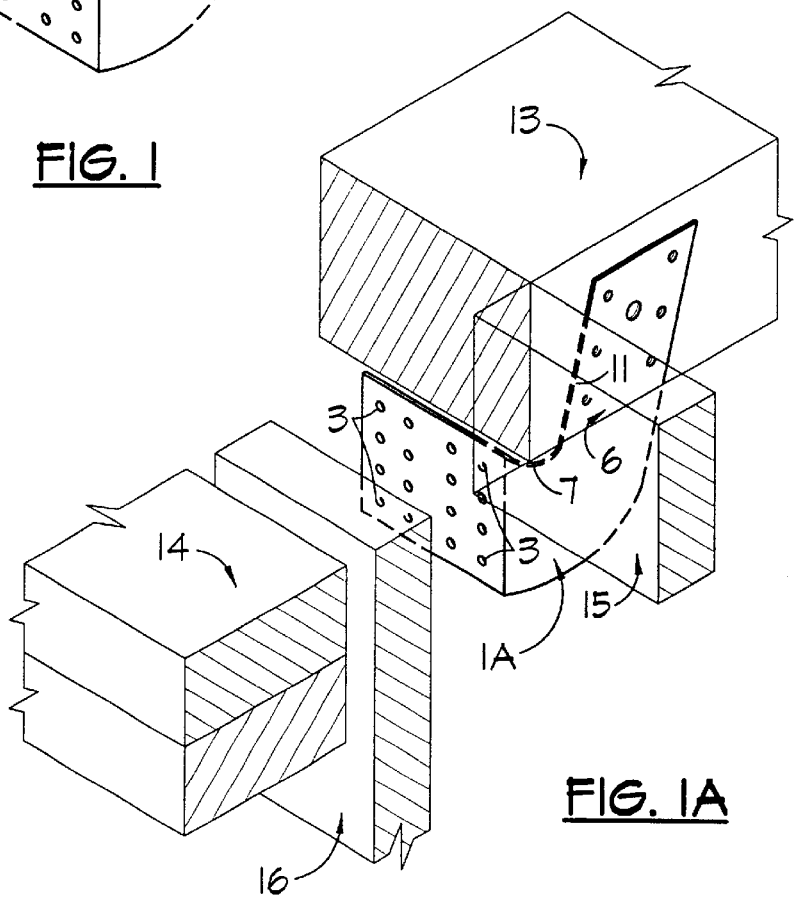
FIG. 1A is a perspective view of the present invention installed on the outside of an existing house.

The right-angle bend can be bent left or right, causing the tie to be left-handed or right-handed. FIG. 1A shows right-handed sheet metal tie "A" in one of its preferred uses, attached to the outside of an existing building structure. Tie "A" connects a timber rafter 13 to a 2×4 top plate 14. The frieze board 15 is shown being cleared by the inner radius 7 of the tie. If the frieze board is warped, a shallow angle on the side 11 of the web member 6 still allows the frieze board to be cleared by the connector. If utility wires are strung along the bottom reveal of the frieze boards, they too will be cleared by the inner radius 7 and shallow angle of the side 11.

Referring to FIG. 1A, when tie "A" is positioned in place, flush against the rafter and top plate, and clearing the frieze board and utility wires, nails are driven from the hidden side of the base member through the outside wall sheathing 16. The slotted nail holes 3 enable long wood screws to penetrate sheathing and firmly secure together the two 2×4's making up the top plate 14.

Figures 2A, 2B:
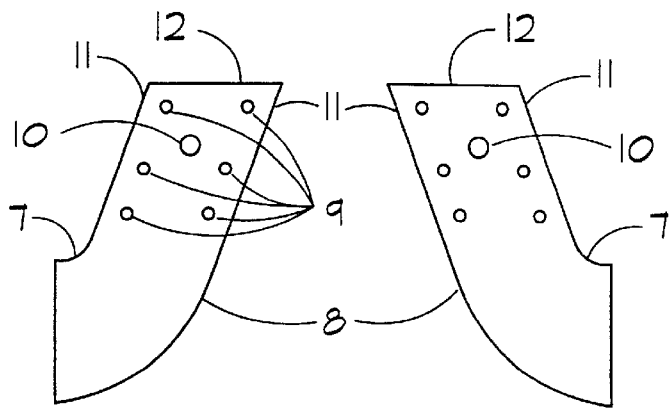
FIG. 2A is a side view of a right-handed tie "A" of the present invention shown in FIG. 1.
FIG. 2B is a side view of a left-handed tie "A" of the present invention shown in FIG. 1

Refer now to FIG. 2A which is a front view of right-handed tie "A" showing the base member 1, the nail holes 2, the slotted nail holes 3, and straight sides 4. FIG. 2B is a side view of left-handed tie "A" with mirror-image parts of FIG. 2A.

FIG. 3 is a front view of a left-handed tie "A" attached to the rafter 13, outside wall 16, into the top plate 14, and around the frieze board 15.

FIG. 3A is a side view of right-handed tie "A" showing the axis of the right-angle bend 5, the web member 6, the inner radius 7 and the outer radius 8. The web member also has nail holes 9, a lag-bolt hole 10, angled side edges 11 and top 12. FIG. 3B shows a side view of left-handed tie "A" with mirror-image parts of FIG. 3A.

Figure 4:
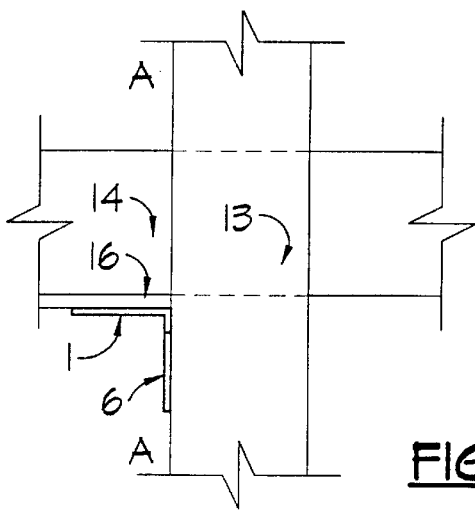
FIG. 4 is a top view of tie "A" shown in FIG. 1.

FIG. 4 shows a top view of left-handed tie "A" installed on the outside of an existing building, tying together a rafter 13, top plate 14, and outside wall sheathing 16. The base member 1 of tie "A" is shown attached to the outside wall 16 and top plate 14. The web member 6 is shown attached to the rafter 13. Cross section A–A' is shown in FIG. 5 and in FIG. 6.

Figure 5:
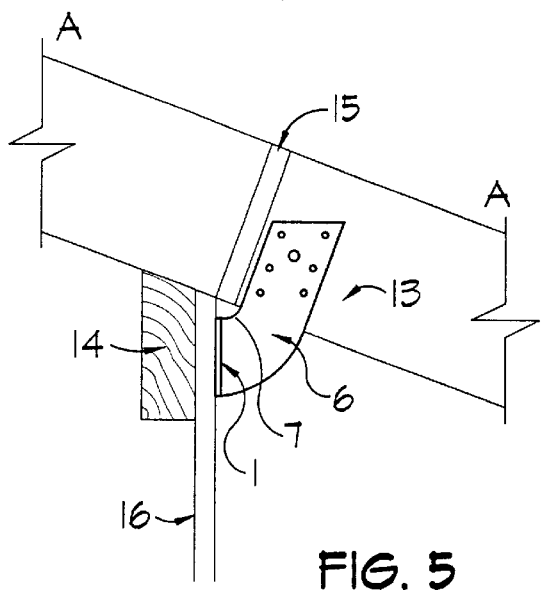
FIG. 5 is a side view of tie "A" installed on a timber plate wood structure.

FIG. 5 is a cross section of a common, existing single-wall or post-and-beam construction building where the rafter 13 is attached to the top plate 14 by a notch cut-out of the rafter and "toe-nailing" from the side. The outside wall sheathing 16 is commonly installed to the top plate 14, wall studs 16A, and sill plate (not shown). The frieze board 15 is commonly attached to the rafters or top plate, and may be angled toward or away from the building in order to prevent the access of animals or insects, to hide the structural framing from the outside, and to form a "reveal" or shadow along the roof line. Utility wires, including: Cable TV, telephone, and alarm wires are commonly installed at the bottom of the frieze board.

FIG. 5 shows left-handed tie "A" tying together a rafter and timber top plate on an existing building structure. The base plate 1, extending out of the page toward the viewer, is attached to the outer wall covering 16 and into the timber top plate 14. The web member 6 is able to be attached to the rafter 13 because the inside radius 7 provides clearance of the frieze board 15.

Figure 6:
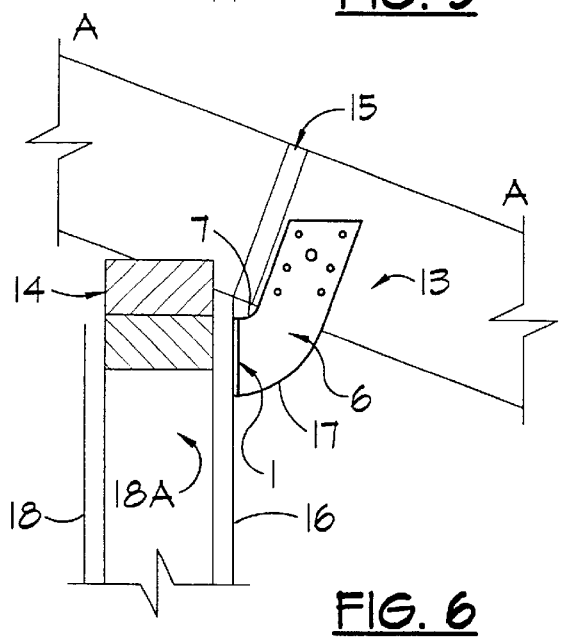
FIG. 6 is a side view of tie "A" installed on a double plate wood structure.

Refer now to FIG. 6 which is a similar cross section of an existing building as in FIG. 5, but is of double-wall platform frame construction where the top plate 14 consists of two 2×4's instead of a timber and the frieze board 15 is angled or warped outward.

On FIG. 6 a left-handed tie "A" is shown tying together the rafter 13, the top plate 14, and outside wall 16. The base member 1 of tie "A", extends out of the paper towards the viewer and also attaches the two 2×4's together against tensional forces. By attaching the two 2×4's together from the side using tie "A", any uplifting force, as from high winds, would have to shear the attaching nails. This requires much more force than the tensional force or pulling apart of 2×4's that are nailed together from the top. By attaching the outside wall sheathing 16 to the top plate 14 and rafter 13 connection, additional strength is gained.

FIG. 6 also shows how the web member 6 of tie "A" is able to clear an angled or warped frieze board and utility wires on the bottom of the frieze board. The inside radius 7 clears the bottom part of the frieze board 15 and any utility wires. The angled side edge 11 clears the main part of the angled or warped frieze board.

Figure 7B:
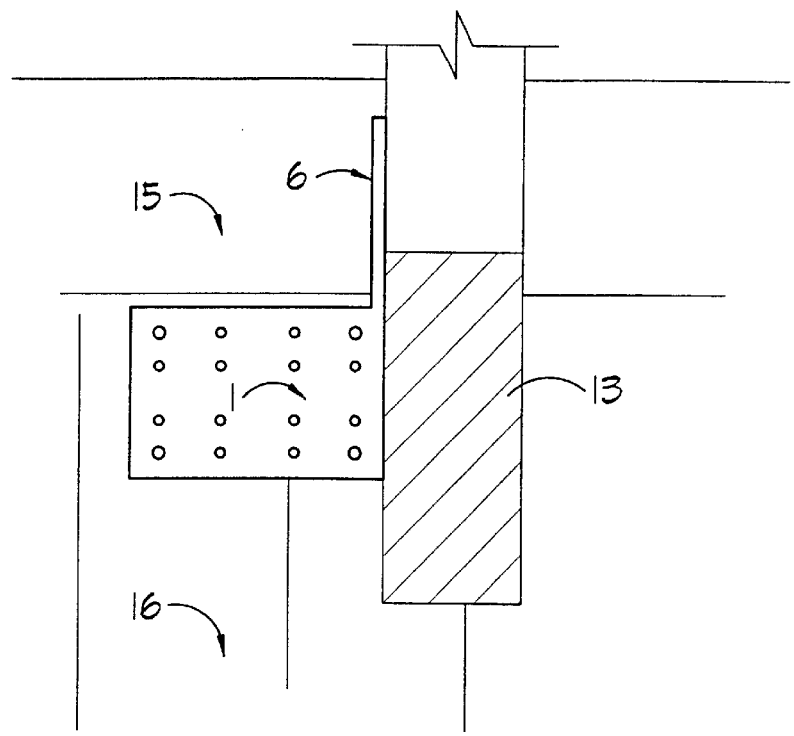
FIG. 7B is a front view of a left-handed tie "A" installed on a wood structure.
Figure 7A:
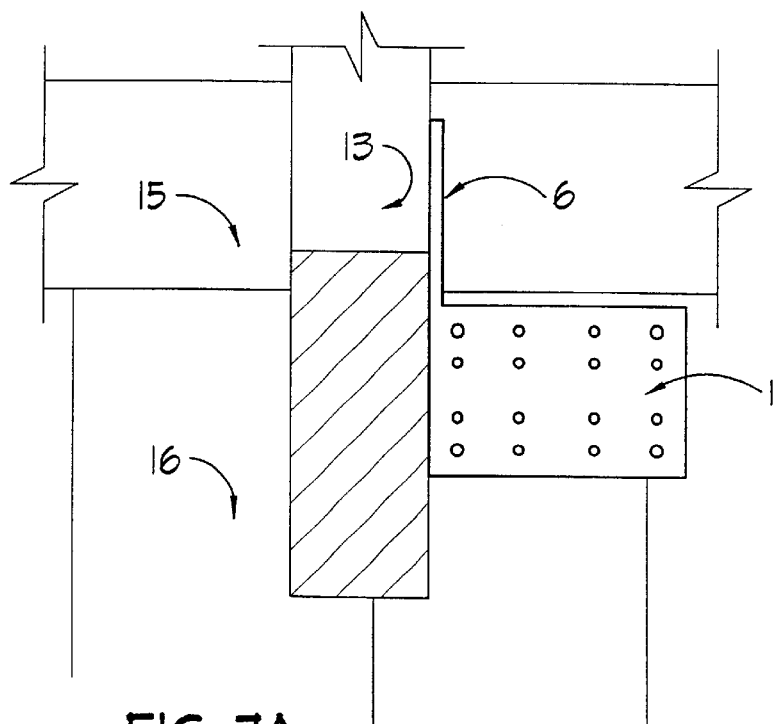
FIG. 7A is a front view of a right-handed tie "A" installed on a wood structure.

Refer now to FIG. 7A which shows a front view of right-handed tie "A" installed on an existing building. The base member 1 is attached to the outside wall 16 and the top plate is hidden behind the base member. The web member 6 clears the frieze board 15 and attaches to a rafter 13. In FIG. 7A, the front of the building is to the right so the ties are less obtrusive from the front. If there are unforeseen obstructions, such as electric lines, electric lights, alarms, etc., in the way a left-handed tie may clear it as shown in FIG. 7B. If a right-handed tie is placed on the right side of a rafter, or a left-handed tie is placed on the left side of a rafter, the base member of the tie will be attached under the rafter, which could attach to the wall post 16A or wall stud 18A and be hidden by trim.

Figure 7C:
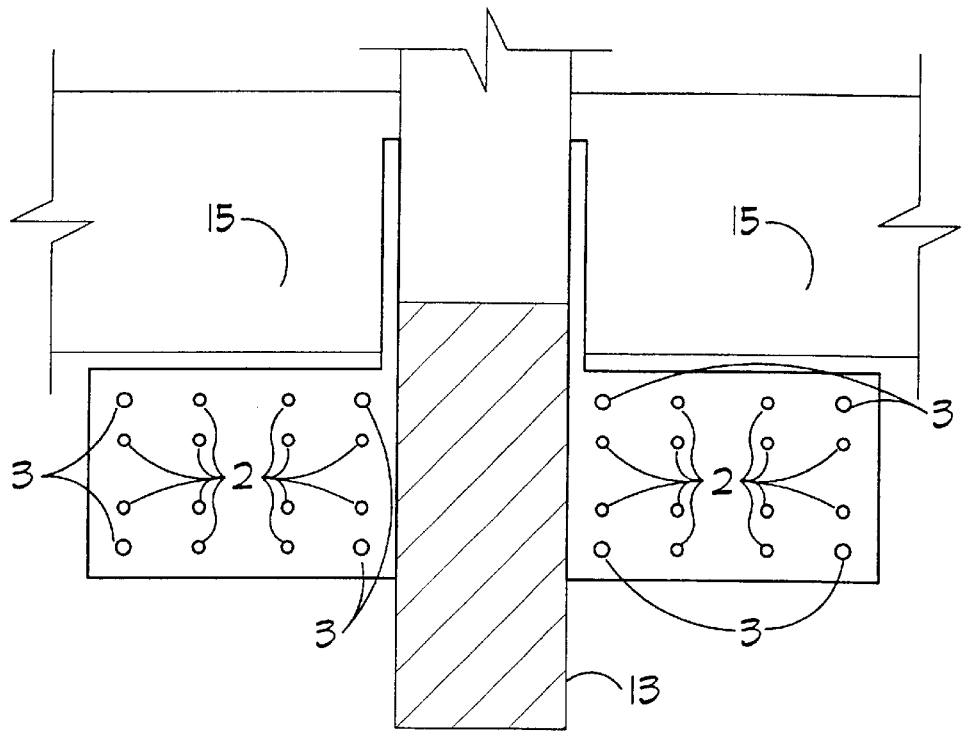
FIG. 7C is a front view showing the added strength of attaching a left- and right-handed tie to a rafter.

FIG. 7C shows the added strength of attaching a left- and right-handed tie to a rafter 13. Two ties could be added to the rafter for added strength or symmetry.

Figure 8:
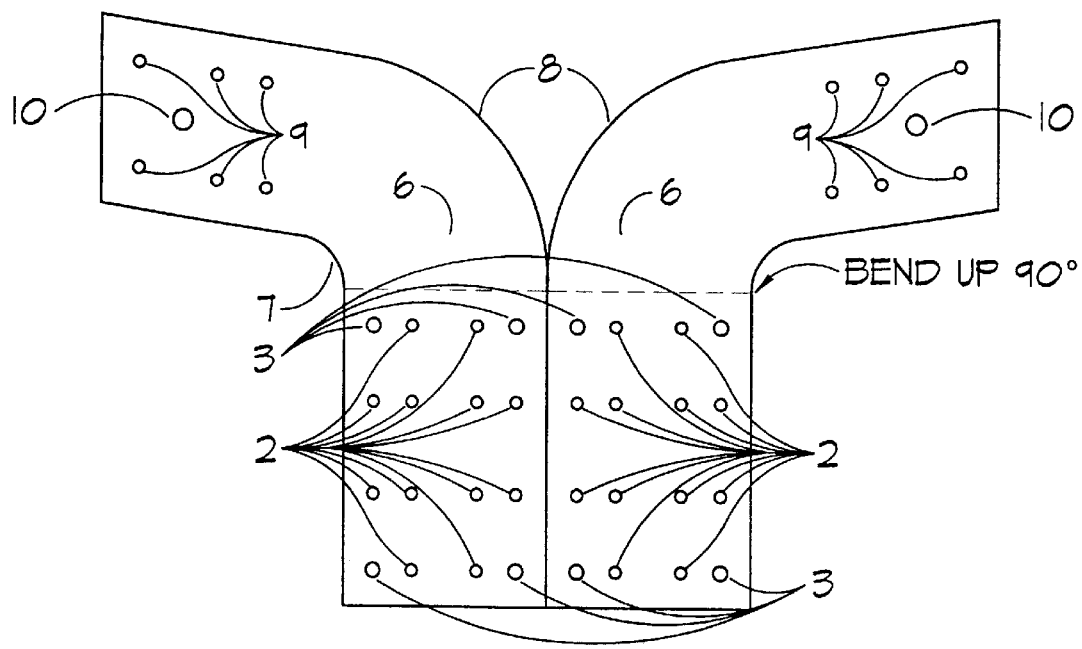
FIG. 8 is a flat-pattern layout of a pair of right- and left-handed tie "A" in blank form, prior to bending and separation.

Refer now to FIG. 8 which shows a preferred embodiment of how a left- and right-handed tie "A" are formed from a blank by cutting along the outside edges. The generally right-angled bend is made by bending up 90 degrees along the axis 5. This forms a right- and left-handed tie, which are mirror images of each other.

The main disadvantage of prior hurricane ties is that they cannot be used on the outside of existing buildings without demolition or destruction of existing wood or utility wires.

FIG. 9 shows a Prior Art hurricane tie designated and sold by Simpson Strong Tie Company, Inc., as an "H4". This tie has a radius 7 at the right-angled bend 5 that is about the size of a nail hole. This radius is used only to prevent the "notching effect" associated with square corners at right-angled bends. This radius does not have any other function. Also the H4 tie does not tie the two 2×4's together at the top plate 14.

Refer now to FIG. 10 which is a perspective drawing of a preferred embodiment of tie "B" of the invention. The unitary sheet metal tie "B" consists of a rectangular base member 1 with straight nail holes 2, and straight sides 4. The base member has a right-angled bend 5 that includes a generally parallelogram-shaped web member 6, that is offset to the axis of the right-angled bend by an offset or joggle 6A.

The web member 6 has nail holes 9 and a lag-bolt hole 10 in the upper part of the member. The sides 11 are generally straight and parallel, and are tilted between 10 and 20 degrees away from the axis of the right angle bend. The top side 12 of the web member is generally parallel to the bottom of the base member.

The right-angle bend can be bent left or right, causing the tie to be left-handed or right-handed. FIG. 10 shows right-handed sheet metal tie "B" in one of its preferred uses, attached to the outside of an existing building structure. Tie "B" connects a timber rafter 13 to a timber top plate 14. The frieze board 15 is shown being cleared by the inner offset 6A of the tie. If the frieze board is warped, a shallow angle on the side 11 of the web member 6 still allows the frieze board to be cleared by the connector. If utility wires are strung along the bottom reveal of the frieze boards, they too will be cleared by the inner offset 6A and shallow angle of the side 11.

Referring to FIG. 10, when tie "B" is positioned in place, flush against the rafter 13 and top plate 14, and clearing the frieze board 15 and utility wires, nails are driven from the hidden side of the base member through the outside wall sheathing 16 and into the timber top plate 14.

Refer now to FIG. 11 which is a front view of right-handed tie "B" showing the base member 1, the nail holes 2, straight sides 4, base part of inner offset 6A, and edge of web member 6.

FIG. 12 is a side view of right-handed tie "B" showing the axis of the right-angle bend 5, the web member 6, inner offset 6A, and outer offset 6B. The web member also has nail holes 9, a lag-bolt hole 10, angled side edges 11 and top 12.

FIG. 12 shows a side view of left-handed tie "B" installed on the outside of an existing building, tying together a rafter 13, top plate 14, and outside wall sheathing 16. The base member 1 of tie "B" is shown attached to the outside wall 16 and top plate 14. The web member 6 is shown attached to the rafter 13. The frieze board 15 is cleared by the inner offset or joggle 6A and angled sides 11.

FIG. 13 shows a top view of left-handed tie "B" showing web member 6, base member 1, and right-angle bend 5.

FIG. 14 is a cross section of a common, existing single-wall or post-and-beam construction building where the rafter 13 is attached to the top plate 14 by a notch cut-out of the rafter and "toe-nailing" from the side. The outside wall sheathing 16 is commonly installed to the top plate 14, wall posts 16A, and sill plate (not shown). The frieze board 15 is commonly attached to the rafters or top plate, and may be angled toward or away from the building in order to prevent the access of animals or insects, to hide the structural framing from the outside, and to form a "reveal" or shadow along the roof line. Utility wires, including: Cable TV, telephone, and alarm wires are commonly installed at the bottom of the frieze board. The frieze board keeps prior hurricane clips from being used on the outside of existing buildings.

FIG. 14 shows left-handed tie "B" tying together a rafter and timber top plate on an existing building structure. The base plate 1, extending out of the page toward the viewer, is attached to the outer wall covering 16 and into the timber top plate 14. The web member 6 is able to be attached to the rafter 13 because the inner offset 6A provides clearance of the frieze board 15.

Refer now to FIG. 15 which is a similar cross section of an existing building as in FIG. 14, but is of double-wall or platform-frame construction, and the top plate 14 consists of two 2×4's instead of a timber and the frieze board 15 is angled or warped outward.

On FIG. 15 a left-handed tie "B" is shown tying together the rafter 13, the top plate 14, wall stud 18A, and outside wall sheathing 16. The base member 1 of tie "B", extends out of the paper towards the viewer and also attaches the two 2×4's together against tensional forces. By attaching the two 2×4's together from the side using tie "B", any uplifting force, as from high winds, would have to shear the attaching nails. This requires much more force than the tensional force or pulling apart of 2×4's that are nailed together from the top. By attaching the outside wall sheathing 16, wall stud 18A, and top plate 14 to the rafter 13, additional strength is gained.

FIG. 15 also shows how the web member 6 of tie "B" is able to clear an angled or warped frieze board and utility wires on the bottom of the frieze board. The inner offset 6A clears the bottom part of the frieze board 15 and any utility wires. The angled side edge 11 clears the main part of the angled or warped frieze board.

Refer now to FIG. 16A which shows a front view of right-handed tie "B" installed on an existing building. The base member 1 is attached to the outside wall 16 and the top plate is hidden behind the base member. The web member 6 clears the frieze board 15 and attaches to a rafter 13. In FIG. 16A, the front of the building is to the right so the ties are less obtrusive from the front. If there are unforeseen obstructions, such as electric lines, electric lights, alarms, etc., in the way a left-handed tie may clear it as shown in FIG. 16B. If a right-handed tie is placed on the right side of a rafter, or a left-handed tie is placed on the left side of a rafter, the base member of the tie will be attached into the wall stud 18A under the rafter, which could be hidden by trim.

FIG. 16C shows the added strength of attaching a left- and right-handed tie to a rafter 13. Two ties could be added to the rafters for added strength or symmetry.

Refer now to FIG. 17 which shows a preferred embodiment of how a left- and right-handed tie "B" are formed from a blank by cutting along the outside edges. The generally right-angled bend is made by bending up 90 degrees along the axis 5. This forms a right- and left-handed tie, which are mirror images of each other.

The main disadvantage of prior hurricane ties is that they cannot be used on the outside of existing buildings without demolition or destruction of existing wood or utility wires.

FIG. 18 shows a Prior Art hurricane tie designated and sold by Simpson Strong Tie Company, Inc., as an "H2.5". This tie has no offset at the right-angled bend 5 and cannot clear any obstructions such as frieze boards or utility wires.

Refer now to FIG. 19 which is a front view of a preferred embodiment of tie "C" of the invention on the outside of an existing building structure. The tie consists of four (4) connectors including an angle iron hold down 20, a ridge plate 23, a rafter plate 24, and a roof fastener 25. These four connectors are tied together by a threaded rod 21. On the roof, a roof fastener 25 ties the roofing material 31 and roof sheathing 30 together by a predetermined standard pipe 28. Under the roof, the rafter 13 and ridge beam 32 are tied together with a rafter plate tie 24, a ridge plate tie 23, and angle iron hold down 20. A metal strap, chain, cable, or nylon strap 19 ties the entire roof structure to a predetermined standard foundation tie (not shown). Tieing the ridge plate and rafter plate together on the outside of a house, and securing this connection to the ground with a strap helps prevent the gable end of the house from blown in or out by high winds.

FIG. 20A shows the front view of the angle iron hold down of tie "C" shown in FIG. 19. The angle iron hold down consists of a rectangular base member 1 with straight nail holes 2 and straight sides 4. The center part of the base member consists of bolt holes 33 for attaching a metal strap 19 that ties to the building foundation or ground.

FIG. 20B shows the top view of the angle iron hold down of tie "C" consisting of slotted holes 34 for insertion of threaded rod 21.

FIG. 20C shows a right side view of the angle iron hold down of tie "C" consisting of the hidden nail holes 2 and bolt holes 33.

FIG. 20D shows a left side view of the angle iron hold down of tie "C" consisting of the hidden nail holes 2 and bolt holes 33.

FIG. 21A shows a front view of the ridge plate connector of tie "C" shown in FIG. 19. The ridge plate 23 consists of a rectangular plate with a number of nail holes 2, lag bolt holes 10, and generally straight sides 4. One end of the plate consists of an attached tube that has an opening 34 that can accommodate a threaded rod 21. The attached tube can be welded on, or rolled as one piece with the rectangular plate 23.

FIG. 21B shows a side view of the ridge plate 23 consisting of hidden nail holes 2, lag bolt holes 10, and threaded rod hole 34.

FIG. 21C shows a top view of the ridge plate 23 consisting of the hole 34 for the threaded rod, and hidden nail holes 2 and lag bolt holes 10. This plate can be used for the left or right side of the ridge beam 32.

FIG. 22A shows a front view of a right-handed rafter plate hold down of tie "C" shown in FIG. 19. The rafter plate consists of a parallelogram-shaped plate 24 with a plurality of hail holes 2, lag bolt holes 10, and notched cut-out 35. The top and bottom sides 4 are generally straight and angled down so as to be parallel to a sloping rafter 13. A notched cut-out 35 provides clearance for steeply-sloped rafters. The end opposite the notched cut-out consists of an attached tube that has an opening 34 that can accommodate a threaded rod. The attached tube can be welded on, or rolled as one piece with the parallelogram-shaped plate 24.

FIG. 22B shows a side view of a right-handed rafter plate hold down 24 of tie "C". This is a mirror image of the right-handed rafter plate shown in FIG. 22D.

FIG. 22C shows a top view of a right-handed rafter plate hold down 24 of tie "C". The side view shows hidden nail holes 2, lag bolt holes 10, and hole 34 for a threaded rod.

FIG. 22D shows a front view of a left-handed rafter plate hold down of tie "C" shown in FIG. 19. The rafter plate consists of a parallelogram-shaped plate 24 with a plurality of hail holes 2, lag bolt holes 10, and notched cut-out 35. The top and bottom sides 4 are generally straight and angled down so as to be parallel to a sloping rafter 13. A notched cut-out 35 provides clearance for steeply-sloped rafters. The end opposite the notched cut-out consists of an attached tube that has an opening 34 that can accommodate a threaded rod. The attached tube can be welded on, or rolled as one piece with the parallelogram-shaped plate 24.

FIG. 22E shows a side view of a left-handed rafter plate hold down 24 of tie "C". This is a mirror image of the right-handed rafter plate shown in FIG. 22B.

FIG. 22F shows a top view of a left-handed rafter plate hold down 24 of tie "C". The side view shows hidden nail holes 2, lag bolt holes 10, and hole 34 for a threaded rod.

FIG. 23 shows a side view of a roof fastener 25 on the roof of an existing building structure. The metal fastener is mostly flat and rectangular with a metal hook on one end for holding down predetermined pipe 28, and net connector 29. The opposite end has a slotted hole 34 to accommodate a threaded rod 21. The hole is concave at the top forming a socket 38 for a pivoting ball 27 with a slotted hole 34. Below the socket 38, on the bottom part of the roof fastener 25, the hole 39 is flared to the outside. FIG. 23A shows the ball 27 that fits into the socket is generally a hemisphere with a slotted hole 34 in the center that can accommodate a threaded rod. The ball and socket allows the connector to tie together roofs of different slope.

The predetermined pipe 28 is commonly found at all hardware stores, and can be screwed together, or cut, to any length. The pipe holds the roof material and roof sheathing tightly to the rafters, ridge beam and top plate. The pipe can be plumbed into the house water system and used to provide solar-heated hot water. If new roof material (shingles, shakes, etc.) is scheduled to be installed after the connector ties are already in place, the top nut 22 can be removed from the top of the roof including the ball 27, roof fastener 25, and pipe 28. These parts can be reconnected after the new roof material is installed.

FIG. 23B shows the side view of a roof fastener 25. The socket 38 and flared hole 39 is shown hidden on the right side of the fastener and the hook for holding the pipe to the roof is seen in profile on the left side.

FIG. 23C shows the front view of a roof fastener 25, with socket 38 and flared hole 39. The width of the fastener gives added strength around the socket 38 and flared hole 39.

FIG. 23D shows a top view of a roof fastener 25, with socket 38 and flared hole 39. The socket enables the fastener to work on roofs of almost any pitch or slope.

FIG. 23E shows a bottom view of a roof fastener 25 with slotted hole 34 for threaded rod. The length of the fastener's slotted hole enables it to work on roofs of almost any pitch or slope.

Refer now to FIG. 24 which shows a midspan roof tie down of tie "D". The tie consists of a rectangular plate 36 with a plurality of nail holes 2 and generally straight sides. A tube, attached to the approximate center of the rectangular plate 36, has an opening 34 that can accommodate a threaded rod 21.

FIG. 24 shows the roof fastener 25, from FIG. 23A, tying the roof material 31 and roof sheathing 30 together and attaching by a threaded rod to the approximate midspan of a rafter 13 by a mid span tie 36.

FIG. 24A shows a front view of a midspan hold down 36 of tie "D" shown in FIG. 24. The front view shows the rectangular shape, generally straight sides 4, lag bolt holes 10, and attached tube with hole 34 for a threaded rod.

FIG. 24B shows a side view of tie "D" with the hidden lag bolt holes 10 and hole 34 for a threaded rod.

FIG. 24C is a top view of tie "D" showing the hold down 36 with the attached tube with hole 34 for a threaded rod, and hidden lag bolt holes 10.

FIG. 25 shows a roof end tie down of tie "E". The tie consists of a parallelogram-shaped plate 37 with a plurality of nail holes 2, lag bolt holes 10, notched cut-out 35, and a tube attached to the approximate center with a hole 34 that can accommodate a threaded rod 21. The attached tube is at an angle to the top and bottom sides, but is generally parallel to the side edges.

In FIG. 25, the roof end tie 37 is attached to the rafter 13 and tied to the roof with a threaded rod 21, a roof fastener 25 and standard pipe 28. Tightening the nut 22 on the threaded rod 21, under the roof end tie 37, ties the roof to the rafter. FIG. 25 shows relationship to hold-downs of FIG. 19.

FIG. 25A is a front view of a roof end tie 37 showing the parallelogram shape, nail holes 2, lag bolt holes 10, attached tube with hole 34 for threaded rod, and notch 35 for steep roofs. This is a left-hand roof end tie, and a right-hand tie would be a mirror image, sloping to the right as in FIG. 25D.

FIG. 25B is a top view of the roof end tie 37 showing nail holes 2, lag bolt holes 10, and the attached tube with hole 34 for accommodating a threaded rod.

FIG. 25C is a side view of the roof end tie 37 showing nail holes 2, lag bolt holes 10, and the attached tube with hole 34 for accommodating a threaded rod.

FIG. 25D is a front view of a right-hand roof end tie 37 showing the parallelogram shape, nail holes 2, lag bolt holes 10, attached tube with hole 34 for threaded rod, and notch 35 for steep roofs.

FIG. 25E is a top view of the roof end tie 37 showing nail holes 2, lag bolt holes 10, and the attached tube with hole 34 for accommodating a threaded rod.

Refer now to FIG. 26. The roof to foundation tie 40 in FIG. 26 is usually attached to the threaded rod 21 underneath the roof end tie down 37 of FIG. 25, with the bolt holes 33 toward the bottom. A metal strap or pipe is attached by bolts and the other end of the strap or pipe has a roof to foundation tie attached by bolts, with the bolt holes toward the top. A predetermined tie or strap connects to the foundation by a threaded rod through the attached tube.

FIG. 26A is a front view of a roof to foundation tie 40. The tie consists of a flat, rectangular-shaped metal plate 40 with generally straight sides and a plurality of bolt holes, on one long end. The other end has an attached tube, parallel to the long end of the plate. The attached tube has a hole 34 that can accommodate a threaded rod.

FIG. 26B is a top view of a roof to foundation tie 40 showing the attached tube with hole 34 and bolt holes 33.

FIG. 26C is a side view of a roof to foundation tie 40 showing the attached tube with hole 34 that can accommodate a threaded rod, and bolt holes 33.

FIG. 27 shows an aerial view of an existing post-and-beam constructed house with a glass roof installed to see the underpinnings of the roof hold downs. On top of the roof are the predetermined pipes 28, commonly found at all hardware stores, used to hold down the roof shingles and sheathing; these pipes are held down with roof fasteners 25. Since the pipes are shown hooked together, they could be plumbed into the house hot water system for greater hold-down strength, and since they are exposed to the sun, they could provide solar hot water to the house. Underneath the roof are the roof tie end 37, mid span tie 36, rafter plate 24, ridge plate 23, and roof to foundation tie 40. A predetermined metal strap 19, available at all hardware stores, ties the roof to a predetermined anchor (not shown) in the foundation or ground.

CONCLUSION, RAMIFICATIONS, AND SCOPE OF INVENTION

Presently, hurricane ties are made for construction of new buildings where wood trim and utility wires would not be obstructing installation. Prior hurricane ties are made to be covered by walls, ceilings, or outside walls. There are no know hurricane ties made that can clear obstructing wood trim or utility wires or tie the outside sheathing to the rafter and top plate.

Accordingly, the reader will see that the hurricane connecting ties of the invention are simple, inexpensive, and easy to install. The invention provides a means of tying together the roof covering, roof sheathing, roof beams or joists, top plate, and outside walls of existing wood structures against shear and tensional forces from strong winds or seismic activity. None of these clips will guarantee a building that is hurricane or earthquake proof, but will make the building stronger.

While my above description contains many specifities, these should not be construed as limitations on the scope of the invention, but rather as an exemplification of one preferred embodiment thereof. Many other variations are possible. For example, the hurricane connecting ties are made of steel that can be painted the same color as the building so they blend in. They can also be painted to contrast with the building or can be made of stainless steel, brass, bronze, aluminum or other metal. The ties may also be made of high-strength plastic to avoid corrosion and electrical conductance. The edges of the ties can be of different shapes, especially being more rounded, or of larger or smaller size.

The hurricane connecting ties of the invention do not have to be installed all at once. Installing all of the connecting ties to an existing building provides a complete load path, meaning that each part of a building is tied to the other and the whole structure is tied to the ground. In wood buildings, the weakest link is often the connection between the roof and the walls. If a homeowner has limited funds, he or she could just install connectors tying together the roof joists, top plates, and outside walls. As the homeowner saved more funds, he or she could install the ties connecting the roof covering, roof sheathing, and roof beams. As more funds became available, the homeowner could install the straps connecting the roof structure to the ground.

Installation of some or all of the hurricane connecting ties to existing structures may allow the homeowner to receive a discount from their homeowners insurance. In fact, some insurance companies may require the clips on existing houses in hurricane-prone areas. Accordingly, the scope of the invention should be determined not by the embodiments illustrated, but by the appended claims and their legal equivalents.

I claim:

1. A sheet metal tie comprising:
   a unitary body member having a right angled bend in said body that defines a substantially rectangular base portion on one side of said bend and a substantially J-shaped web portion on an opposite side of said bend;
   said J-shaped web portion having opposed parallel side edges located remote from said bend, with a centerline axis centered between said opposed parallel side edges; and
   said centerline axis of said web portion laterally offset from and at an acute angle to said vertical axis of said base portion.

2. The sheet metal tie of claim 1, wherein said base portion and said web portion each having a plurality of holes adapted to receive fasteners therein.

3. The sheet metal tie of claim 1, further comprising a radiused edge located between at least one of said parallel side edges of said web portion and said right angle bend.

4. A unitary sheet metal tie having a substantially J-shaped web portion, a lateral offset centerline, and a radiused edge as a means for unhindered attachment to existing roof members and having a right angled bend and substantially rectangular base portion as a means for attachment to existing walls, thereby preventing uplift, detachment, and lateral movement during storms or earth movements.

\* \* \* \* \*